United States Patent
Ramanathan et al.

(10) Patent No.: US 11,416,847 B1
(45) Date of Patent: Aug. 16, 2022

(54) PURCHASE INCENTIVE DATA STRUCTURES FOR MOBILE WALLET APPLICATIONS

(71) Applicant: Wells Fargo Bank, N.A., San Francisco, CA (US)

(72) Inventors: Ramanathan Ramanathan, Bellevue, WA (US); Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/248,820

(22) Filed: Feb. 9, 2021

Related U.S. Application Data

(63) Continuation of application No. 15/452,361, filed on Mar. 7, 2017, now Pat. No. 10,929,840.

(51) Int. Cl.
*G06Q 20/36* (2012.01)
*G06Q 30/02* (2012.01)
*G06Q 20/32* (2012.01)
*G06Q 20/38* (2012.01)

(52) U.S. Cl.
CPC ......... *G06Q 20/363* (2013.01); *G06Q 20/322* (2013.01); *G06Q 20/387* (2013.01); *G06Q 30/0225* (2013.01)

(58) Field of Classification Search
CPC .. G06Q 20/363; G06Q 20/322; G06Q 20/387; G06Q 30/0225
See application file for complete search history.

(56) References Cited

U.S. PATENT DOCUMENTS

| | | |
|---|---|---|
| 10,929,840 B1 | 2/2021 | Ramanathan et al. |
| 2009/0000361 A1 | 2/2009 | Byerley et al. |
| 2010/0010964 A1 | 1/2010 | Skowronek et al. |
| 2013/0054336 A1 | 2/2013 | Graylin |
| 2013/0060622 A1 | 3/2013 | Kail |
| 2014/0108108 A1* | 4/2014 | Artman ............... G06Q 20/384 705/14.1 |
| 2014/0310076 A1 | 10/2014 | Liberty et al. |
| 2015/0046240 A1 | 2/2015 | Moreton |

(Continued)

OTHER PUBLICATIONS

"U.S. Appl. No. 15/452,361, Appeal Brief filed Sep. 14, 2020", 23 pgs.

(Continued)

*Primary Examiner* — Alexandru Cirnu
(74) *Attorney, Agent, or Firm* — Schwegman Lundberg & Woessner, P.A.

(57) ABSTRACT

Various examples are directed to systems and methods for utilizing purchase incentives in an electronic mobile wallet application. The mobile wallet application may receive a committable coupon data structure comprising terms data describing a purchase incentive and cryptographic verification data. The mobile wallet application may send a request to tokenize the committable coupon data structure to an element management system. The request may include an indication of a payment element associated with the mobile wallet application. The mobile wallet application may receive, from the element management system, a tokenized coupon data structure that comprises at least a portion of the committable coupon data structure and credential data for the payment element.

20 Claims, 14 Drawing Sheets

(56) References Cited

U.S. PATENT DOCUMENTS

2015/0088753 A1\* 3/2015 Van Der Schueren .................. G06Q 20/326 705/67
2016/0071094 A1 3/2016 Krishnaiah et al.

OTHER PUBLICATIONS

"U.S. Appl. No. 15/452,361, Examiner Interview Summary dated Mar. 5, 2020", 3 pgs.
"U.S. Appl. No. 15/452,361, Examiner Interview Summary dated Oct. 9, 2020", 2 pgs.
"U.S. Appl. No. 15/452,361, Final Office Action dated Apr. 15, 2020", 21 pgs.
"U.S. Appl. No. 15/452,361, Non Final Office Action dated Jan. 3, 2020", 15 pgs.
"U.S. Appl. No. 15/452,361, Notice of Allowance dated Oct. 21, 2020".
"U.S. Appl. No. 15/452,361, Response filed Apr. 3, 2020 to Non Final Office Action dated Jan. 3, 2020".
Leung, Antoinette, et al., "On Designing a Flexible E-Payment System with Fraud Detection Capability", 8 pgs.

\* cited by examiner

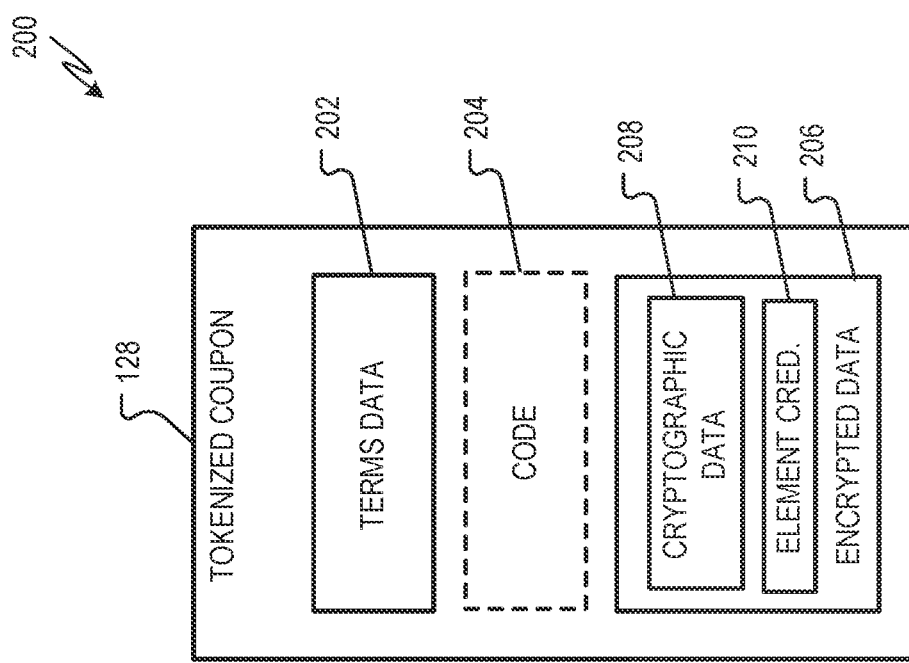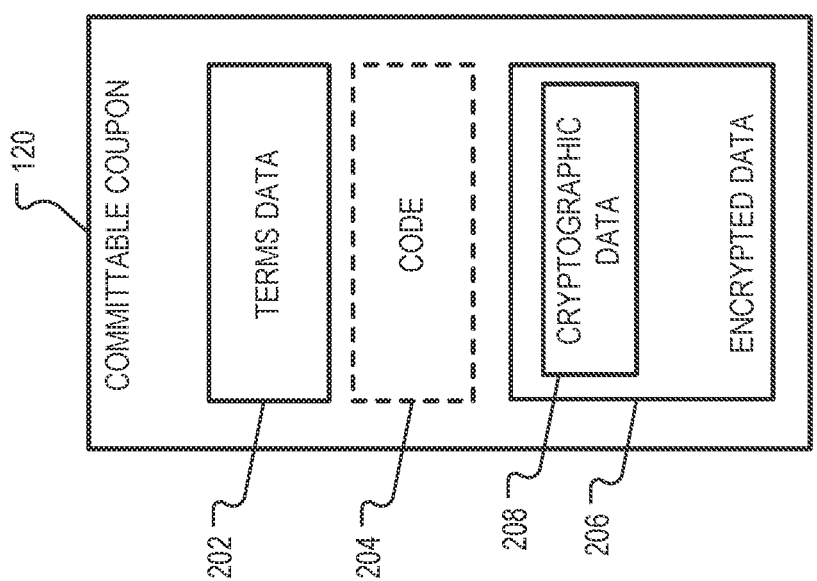
FIG. 2

PURCHASE INCENTIVE DATA STRUCTURES FOR MOBILE WALLET APPLICATIONS

CROSS-REFERENCE TO RELATED APPLICATION

This application is a continuation of U.S. patent application Ser. No. 15/452,361, filed Mar. 7, 2017, now issued as U.S. Pat. No. 10,929,840, which is incorporated by reference herein in its entirety.

TECHNICAL FIELD

Embodiments described herein generally relate to systems and methods for generating data structures and/or communicating data structures between mobile wallet applications and/or between mobile wallet applications and management systems.

BACKGROUND

Manufacturers and merchants have traditionally used coupons to provide incentives for customers to purchase goods and services from certain manufacturers and/or to patronize certain merchants. Coupons are traditionally printed in paper form and provided to consumers directly or in newspapers or other publications.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIG. 2 is a diagram showing additional details of example purchase incentive data structures.

DETAILED DESCRIPTION

Figure 1:
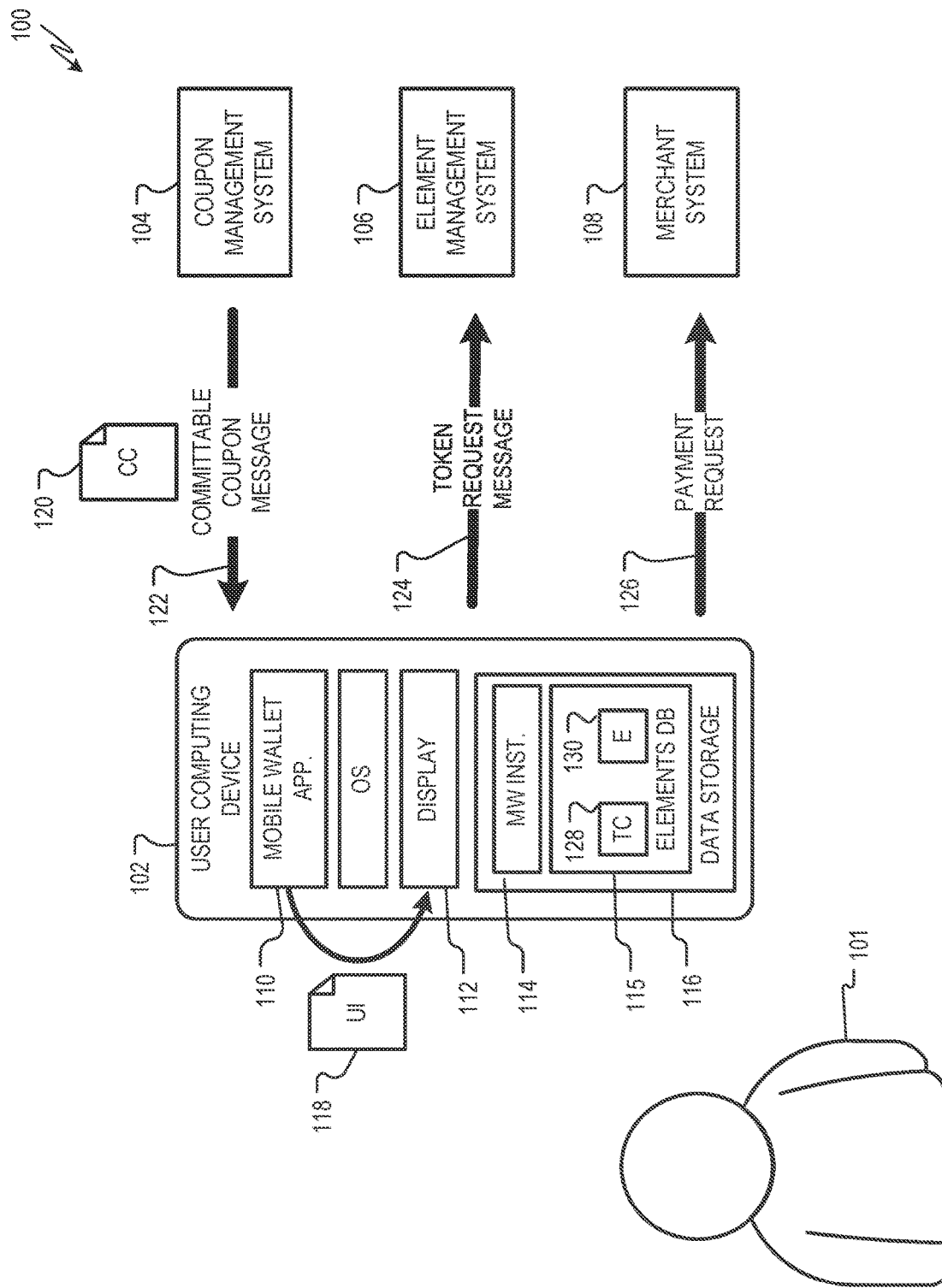
FIG. 1 is a diagram showing one example of an environment for generating and using purchase incentive data structures.

Various examples described herein are directed to systems and methods for generating, tokenizing, and/or distributing purchase incentive data structures, such as committable coupon data structures and tokenized coupon data structures. Purchase incentive data structures, as described herein, may be used to distribute purchase incentives to a mobile wallet application and track the use of the purchase incentives. For example, a committable coupon data structure associated with a purchase incentive may be provided to a mobile wallet application. The committable coupon data structure may be associated with a payment element of the mobile wallet application (e.g., a credit card account, a checking account, etc.) to form a tokenized coupon data structure. The mobile wallet application may utilize the tokenized coupon data structure as a payment element, for example, as payment in a transaction redeeming the associated purchase incentive.

Utilizing purchase incentive data structures, as described herein, may allow better targeting and tracking of purchase incentives. For example, although digitized purchase incentives can be distributed and transferred among mobile wallet applications, targeting and tracking the use of digitized purchase incentives is more difficult. Generating, distributing, and/or tokenizing the purchase incentive data structures as described herein may allow improved targeting and tracking. For example, mobile wallet users who are willing to associate a payment element with a purchase incentive data structure may be more likely to redeem the associated purchase incentive. Further, in some examples, a coupon management system may track the tokenization process whereby a purchase incentive data structure is associated with a user's payment element and/or a payment process whereby a tokenized coupon data structure is used to make a payment (and thereby redeem the associated purchase incentive). This may allow the coupon management system to track the number of purchase incentives that are likely to be redeemed as well as those actually redeemed.

In some examples, a committable coupon data structure may be provided to a mobile wallet application, for example, by a coupon management system, another mobile wallet application, or other party. The committable coupon data structure may include terms data describing a purchase incentive associated with the committable coupon data structure. In some examples, the committable coupon data structure may be tokenized with a payment element of the mobile wallet application before use. The mobile wallet may send a request to tokenize the committable coupon data structure, for example, to an element management system associated with the payment element to be associated with the committable coupon data structure. The element management system may tokenize the committable coupon data structure by incorporating data describing the payment element and/or credential data for the user of the mobile wallet application into a tokenized coupon data structure. This may allow the tokenized data structure to be presented and used as a payment element for making payments with the mobile wallet application, as described herein. The tokenized coupon data structure may be sent to the mobile wallet application, which may, in some examples, store the tokenized coupon data structure as it would other payment elements.

When the user of the mobile wallet application desires to redeem the purchase incentive, the user may request that a payment be made to a merchant or other party associated with the purchase incentive using the tokenized coupon data structure as a payment element. For example, instead of presenting data for a credit card account or other payment element, the mobile wallet application may provide the tokenized coupon data structure. In some examples, rather than being made to a merchant, payment may be made directly to a manufacturer.

In some examples, the element management system obtains the consent of a coupon management system and/or notifies the coupon management system upon tokenization of the committable coupon data structure. In this way, the coupon management system may track the associated purchase incentive and determine whether it is likely to be used. For example, a mobile wallet user who is willing to tokenize a committable coupon data structure may be more likely to utilize the associated purchase incentive than a user that is not willing to tokenize.

FIG. 1 is a diagram showing one example of an environment 100 for generating and using purchase incentive data structures. For example, FIG. 1 shows a user computing device 102, a coupon management system 104, an element management system 106, and a merchant system 108. Also shown is an example user 101, described herein as a user of the user computing device 102 and/or a user of the mobile wallet application 110.

The mobile wallet application 110 (sometimes referred to herein as a mobile wallet), may be executed by a processing unit of the user computing device 102. The mobile wallet application 110 may be programmed to manage mobile wallet elements, including payment elements and non-payment elements. Payment elements may be and/or reference user accounts that can fund a payment, including, for example, credit card accounts, debit accounts, checking accounts, savings accounts, gift cards or other pre-paid cards, cashier's checks, digital currency, etc. For example, a user may utilize the mobile wallet application 110 to make online and/or in-person payments from payment elements. Non-payment elements may be and/or reference user accounts, memberships, etc., that do not include funds for making a payment. Examples of non-payment elements include employee cards, insurance cards, membership cards, and driver's licenses. The user 101 may utilize the mobile wallet application 110 to present non-payment elements, for example, as proof of identity, to receive a service, etc. Example mobile wallet applications include, but are not limited to, APPLE PAY®, ANDROID PAY®, GOOGLE WALLET®, CURRENT C® by MCX®, SAMSUNG PAY®, PAYPAL®, retailer-specific mobile wallet applications such as the STARBUCKS® App, and peer-to-peer payment apps such as VENMO®, SQUARE CASH®, and TILT APP®.

The user computing device 102 may be any suitable computing device for executing a mobile wallet application 110. Example user computing devices 102 may include smart phones, tablet computers, laptop computers, smart watches, etc. The user computing device 102 may comprise data storage 116, which may store data for executing the mobile wallet application 110 as described herein. For example, the data storage 116 may store mobile wallet instructions 114. A processing unit of the user computing device 102 may execute the mobile wallet instructions 114 to implement the mobile wallet application 110. (See FIGS. 12-14 for examples of processors and other processing units in computing devices.) The data storage 116 may also store other data for the mobile wallet application 110 including, for example, at an elements database 115. The elements database 115 may comprise data describing one or more payment or non-payment elements of the mobile wallet application 110. Data stored at the elements database 115 may include, for example, identification data uniquely identifying an element 130, historical usage data describing past uses of an element by the mobile wallet application 110, usage policy data describing when an element may be used, etc. In some examples, the elements database 115 may also include one or more tokenized coupon data structures 128, as described herein.

The user computing device 102 may also comprise a display 112. The display 112 may be or include any suitable type of display including, for example, a liquid crystal display (LCD), an organic light emitting diode (OLED) display, etc. In some examples, the display 112 is a touch-screen or other touch-sensitive display allowing the user 101 to provide input to the user interface (UI) 118. In some examples, the mobile wallet application 110 is programmed to generate a UI 118, which may be a graphical user interface (GUI). The UI 118 may be generated by the mobile wallet application 110 and displayed at the display 112. The user 101 may provide input via the UI 118 using the touchscreen. Also, in some examples, the user 101 may provide input to the UI 118 using various other input devices of the user computing device 102 in addition to or instead of using a touchscreen. Other input devices may include, for example, a mouse, a track ball, etc.

The coupon management system 104 may issue and/or manage purchase incentive data structures, such as committable coupon data structures and/or tokenized coupon data structures described herein. For example, the coupon management system 104 may generate and/or distribute committable coupon data structures, such as committable coupon data structure 120. The coupon management system 104, in some examples, may also track and/or manage the tokenization of committable coupon data structures to form tokenized coupon data structures. The coupon management system 104 may comprise one or more computing devices such as, for example, desktop computers, laptop computers, servers, mobile devices, etc.

The element management system 106 may be associated with an issuer of a payment element. For example, an element management system 106 for a payment element that is a credit card may be implemented by or otherwise associated with a financial institution that issued the credit card. Also, in some examples, a payment element that is a checking account may be implemented or otherwise associated with a financial institution where the checking account is held. The element management system 106, as described herein, may tokenize or assist in the tokenization of a committable coupon data structure. The element management system 106 may comprise one or more computing devices such as, for example, desktop computers, laptop computers, servers, mobile devices, etc.

The merchant system 108 may be a system for receiving a payment from the mobile wallet application 110. For example, the merchant system 108 may be associated with a merchant or other provider of goods and/or services. In some examples, the merchant system 108 may be or include a Point of Sale (POS) device, a web server or other payment network device associated with a web or Internet merchant, etc. The merchant system 108 may comprise one or more computing devices such as, for example, desktop computers, laptop computers, servers, mobile devices, etc.

FIG. 1 also shows the use of example purchase incentive data structures including an example committable coupon data structure 120 and an example tokenized coupon data structure 128. The coupon management system 104 may send the committable coupon communication 122 to the mobile wallet application 110, where the committable coupon communication 122 includes the committable coupon data structure 120. In some examples, the committable coupon communication 122 may be sent by various other parties including, for example, another mobile wallet application, a merchant website, or other merchant device, etc. The committable coupon data structure 120 may include terms data describing an associated purchase incentive. The purchase incentive may be, for example, a particular price for an offer of a product or service, a discount for an offer of a product or service, a purchase condition for an offer of a product or service (e.g., buy one, get one free), etc. The mobile wallet application 110 may cause the user computing device 102 to store the committable coupon data structure 120 at the data storage 116.

In some examples, the committable coupon data structure 120 may be tokenized, for example, by associating a payment element, such as the payment element 130. Tokenization may result in a tokenized coupon data structure 128. In some examples, the mobile wallet application 110 initiates tokenization of the committable coupon data structure 120. For example, the mobile wallet application 110 may send a token request message 124 to the element management system 106 of a payment element 130 to be tokenized with the committable coupon data structure 120. In some examples, the user 101 may select the committable coupon data structure (or an indication thereof at the UI 118) and a payment element 130 for tokenization. The mobile wallet application 110 may direct the token request message 124 to the element management system 106 associated with the selected payment element 130.

The element management system 106 may tokenize the committable coupon data structure 120 to form the tokenized coupon data structure 128. For example, the element management system 106 may incorporate credential data for use of the payment element 130 into all or part of the committable coupon data structure 120 to generate the tokenized coupon data structure 128. The credential data may include, for example, a user name and password or other verification data that will permit the payment element 130 to be used for purchases. In some examples, the credential data also includes an indicator of the payment element 130 such as, for example, an account number. The element management system 106 may provide the tokenized coupon data structure 128 to the mobile wallet application 110. The mobile wallet application 110, in some examples, may store the tokenized coupon data structure 128 at a secure location, for example, similar to where the mobile wallet application 110 stores payment elements 130. For example, the mobile wallet application may store the tokenized coupon data structure 128 at the elements database 115, which may be encrypted and/or otherwise secured from other applications executing at the user computing device 102 and/or from extern access.

The user 101 may select the tokenized coupon data structure 128 to make a payment. For example, the user 101 may select the tokenized coupon structure 128 as the user would select a payment element, such as the payment element 130, for a payment. The payment may be in response to an offer of goods or services. For example, the payment may be for a purchase that redeems the purchase incentive of the tokenized coupon data structure 128. The mobile wallet application 110 (e.g., in response to an instruction from the user 101 via the UI 118) may send a payment request 126 to the merchant system 108. The payment request 126 may include the tokenized coupon data structure 128, for example, to act as a payment element for the purchase.

FIG. 2 is a diagram 200 showing additional details of example purchase incentive data structures, such as the committable coupon data structure 120 and the tokenized coupon data structure 128. The committable coupon data structure 120 includes terms data 202 and encrypted data 206. The terms data 202 may describe a purchase incentive associated with the committable coupon data structure 120. For example, the terms data 202 may describe a particular price for an offer of a product or service, a discount for an offer of a product or service, a purchase condition for an offer of a product or service (e.g., buy one, get one free), etc. Terms data 202 may be in the clear (e.g., unencrypted) or otherwise readable by the mobile wallet application 110. In this way, the mobile wallet application 110 may provide the user 101 with a description of the purchase incentive that the user 101 may use to determine whether to tokenize the committable coupon data structure 120. (See FIGS. 6 and 7 for examples of user selecting and/or tokenizing a committable coupon data structure 120.)

The encrypted data 206 may include data used by various other systems, such as the coupon management system 104, the element management system 106, the merchant system 108, and/or a wallet management system 131 (FIG. 3) to verify, tokenize, or otherwise act upon the committable coupon data structure 120. In some examples, the encrypted data 206 includes cryptographic verification data 208. Cryptographic verification data 208 may be or include a result of applying a cryptographic function, such as a hash function or encryption function, to all or part of the terms data 202. Applying a hash function to data may also be referred to as taking a hash of the data. The coupon management system 104 may utilize the cryptographic verification data 208 to verify the terms data 202, for example, to determine whether any party has tampered with the terms data 202.

In some examples where a hash function is used to generate the cryptographic verification data 208, the coupon management system 104 may keep the hash function secret. The coupon management system 104 may verify the committable coupon data structure 120 by applying the secret hash function to all or part of the terms data 202. If the result matches the cryptographic verification data 208, it may indicate that no tampering has occurred. Similarly, if the result of hashing the terms data 202 does not match the cryptographic verification data 208, it may indicate that tampering of the terms data 202 has occurred.

In some examples where an encryption function is used, the coupon management system 104 may keep secret a key used with the encryption function to generate the cryptographic verification data 208. The coupon management system 104 may verify the committable coupon data structure 120 by decrypting the cryptographic verification data 208 with the secret key. If the result matches some or all of the terms data 202, it may indicate that no tampering has occurred. Similarly, if the result does not match some or all of the terms data 202, it may indicate that tampering with the terms data 202 has occurred.

The committable coupon data structure 120 may optionally include code 204. Code 204 may be executable by the user computing device 102 to perform various tasks related to the committable coupon data structure 120. The code 204 may be of any suitable type. In some examples, the code 204 may include compiled object code. Also, in some examples, the code 204 may include script that is interpreted at runtime. In some examples, the code 204 may be executable to tokenize the committable coupon data structure 120. For example, the code 204 may include instructions for sending all or part of the committable coupon data structure 120 to the coupon management system 104 and/or element management system 106 for tokenization.

The example tokenized coupon data structure 128 shown in FIG. 2 includes the components 202, 204, 206, 208 of the committable coupon data structure 120. In some examples, however, some or all of the components 202, 204, 206, 208 may be omitted and/or modified. In some examples, clear terms data 202 may be omitted and/or modified. For example, clear terms data 202 may be modified to include an indication of the payment element 130 and/or an element management system 106 for the payment element 130. This may allow a merchant system 108 to request authorization for the payment from the correct element management system 106.

Also, in some examples, code 204 at the tokenized coupon data structure 128 may be expanded, for example, to include instructions for using the tokenized coupon data structure as a payment element in a payment transaction. Also, in some examples, the encrypted data 206 at the tokenized coupon data structure 128 may also include payment element credential data 210. Payment element credential data 210 may include credentials of the user 101 and/or mobile wallet application 110 for utilizing a particular payment element. When the tokenized coupon data structure 128 is used as a payment element, the credential data 210 may be utilized to validate the transaction, for example, as described herein.

Figure 3:
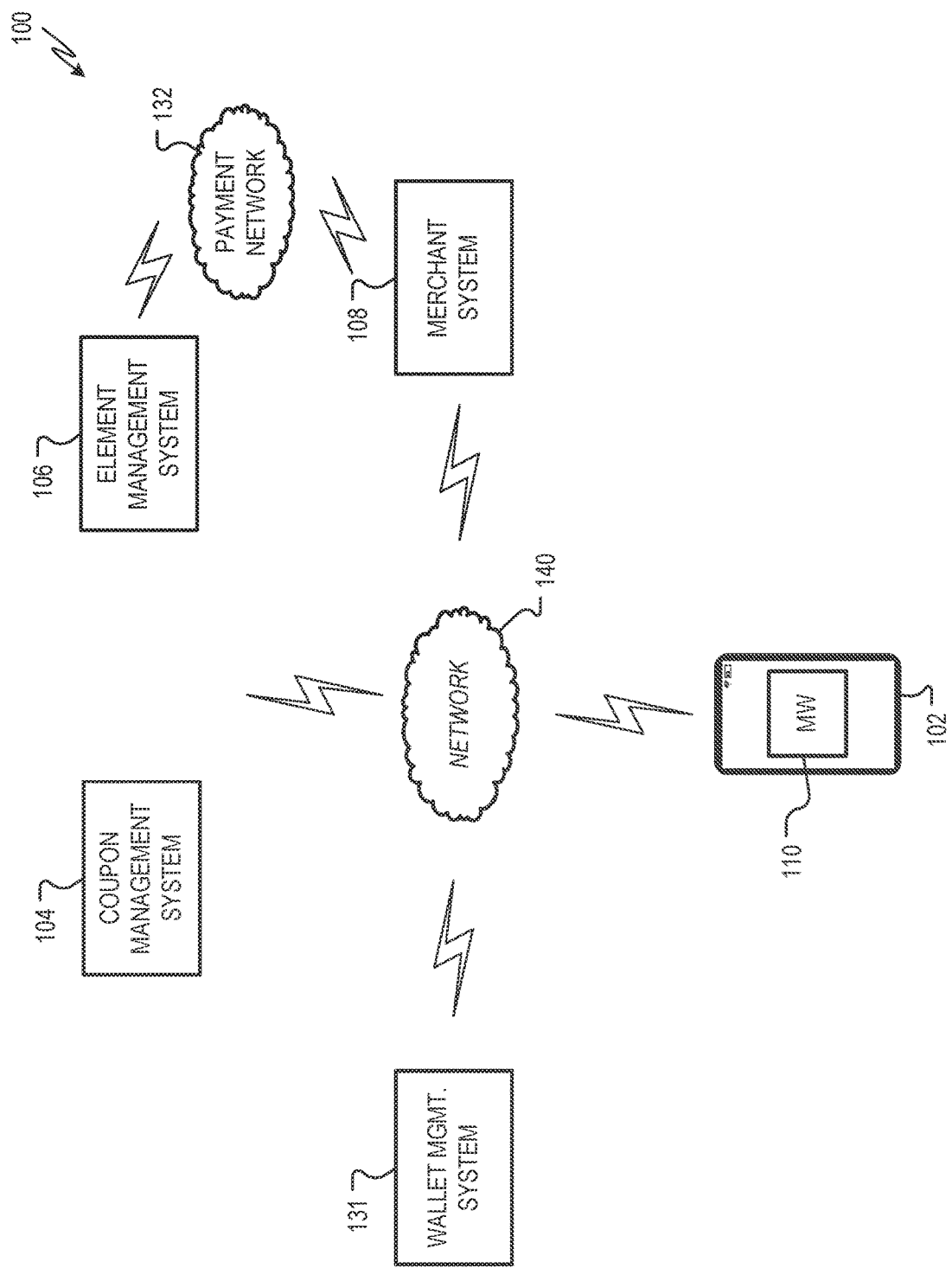
FIG. 3 is a diagram showing one example of the environment of FIG. 1 with additional details.

FIG. 3 is a diagram showing one example of the environment 100 with additional details. FIG. 3 shows the user computing device 102, mobile wallet application 110, coupon management system 104, element management system 106, and merchant system 108 of FIG. 1. FIG. 3 also shows a payment network 132. The payment network 132 may be a network used for processing payment and/or payment elements. For example, the payment network 132 may be an interbank network, such as the PLUS network, the CIRRUS network, etc. The element management system 106 may also be in communication with the payment network 132.

FIG. 3 also shows a wallet management system 131. The wallet management system 131 may manage the mobile wallet application 110 and, in some examples, is implemented by a provider of the mobile wallet (e.g., a mobile wallet provider). In some examples, the mobile wallet provider is a financial institution, software company, or any other organization that provides and maintains the mobile wallet application 110. For example, the GOOGLE WALLET® mobile wallet application may be provided and maintained by Google, Inc.

The various components of the environment 100 may be in communication with one another via a network 140. The network 140 may be or comprise any suitable network element operated according to any suitable network protocol. For example, one or more portions of network 140 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 4:
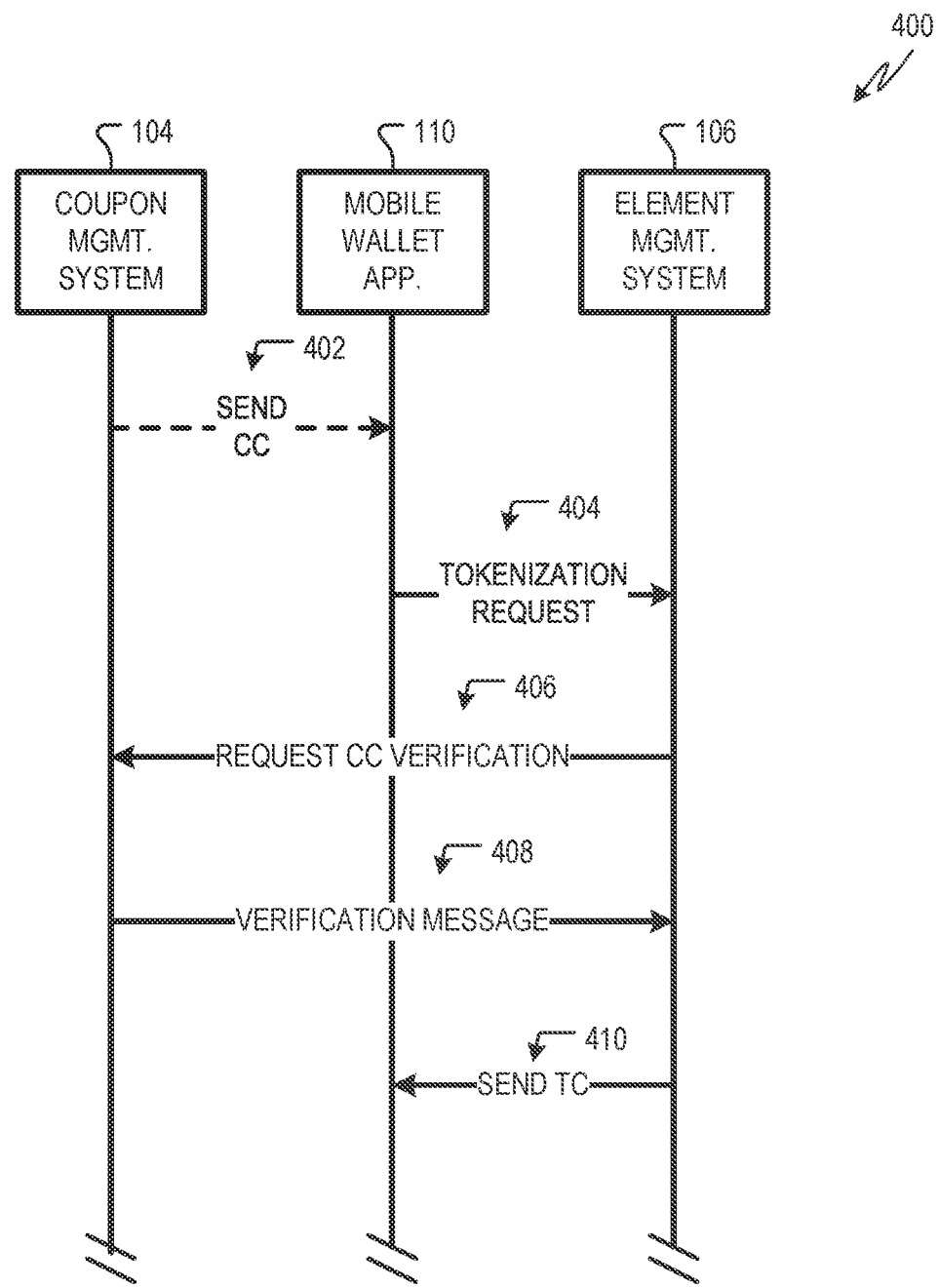
FIG. 4 is a transaction diagram showing one example of a process for tokenizing a committable coupon data structure.

FIG. 4 is a transaction diagram showing one example of a process 400 for tokenizing a committable coupon data structure 120. Optionally, the coupon management system 104 may send the committable coupon data structure 120 to the mobile wallet application 110 at operation 402. In some examples, the committable coupon data structure 120 may be provided to the mobile wallet application 110 by another component such as, for example, another mobile wallet application as described herein. At operation 404, the mobile wallet application 110 may send a tokenization request to the element management system 106. The tokenization request may include all or part of the committable coupon data structure 120 and may also include an identification of a payment element to be committed to the committable coupon data structure 120 as well as credentials for the selected payment element. The credentials may include, for example, an account number, a one-time-use account number, a user name, a password, etc.

Before tokenizing the committable coupon data structure 120, the element management system 106 may request that the coupon management system 104 verify the committable coupon data structure 120 as operation 406. For example, the verification request at operation 406 may include all or part of the committable coupon data structure 120. The coupon management system 104 may verify the committable coupon data structure 120, for example, by comparing cryptographic verification data 208 with terms data 202, for example, as described above. In some examples, the coupon management system 104 may maintain records indicating the number of mobile wallet applications, such as 110, that have tokenized a particular committable coupon data structure 120. In this way, the coupon management system 104 may track the distribution of the associated purchase incentive and estimate the number of times that the purchase incentive will be used. Also, as described herein, the coupon management system 104 may offer additional incentives to users who distribute the committable coupon data structure 120 to other users.

Provided that the committable coupon data structure 120 is verified, the coupon management system 104 may send a verification message to the element management system 106 at operation 408. The verification message may indicate that the committable coupon data structure 120 is verified and is suitable for tokenization. If the coupon management system 104 determines that the committable coupon data structure 120 is not suitable for tokenization, it may instead send a cancellation message to the element management system 106. The cancellation message may indicate that the tokenization should not proceed. A committable coupon data structure 120 may not be suitable for tokenization, for example, if the terms data has been tampered with, if the purchase incentive has expired or is near expiration, etc.

If the verification message is received, the element management system 106 may generate a tokenized coupon data structure 128, for example, by incorporating the credential data 210 into the committable coupon data structure 120. The resulting tokenized coupon data structure 128 may be provided to the mobile wallet application 110 at operation 410. In some examples, the tokenized coupon data structure 128 may be generated by the coupon management system 104. For example, the verification request at operation 406 may include the credential data. The coupon management system 104 may use the credential data and the committable coupon data structure 120 to generate the tokenized coupon data structure 128, which may be returned to the element management system 106 at operation 408 and ultimately to the mobile wallet application 110 at operation 410.

Figure 5:
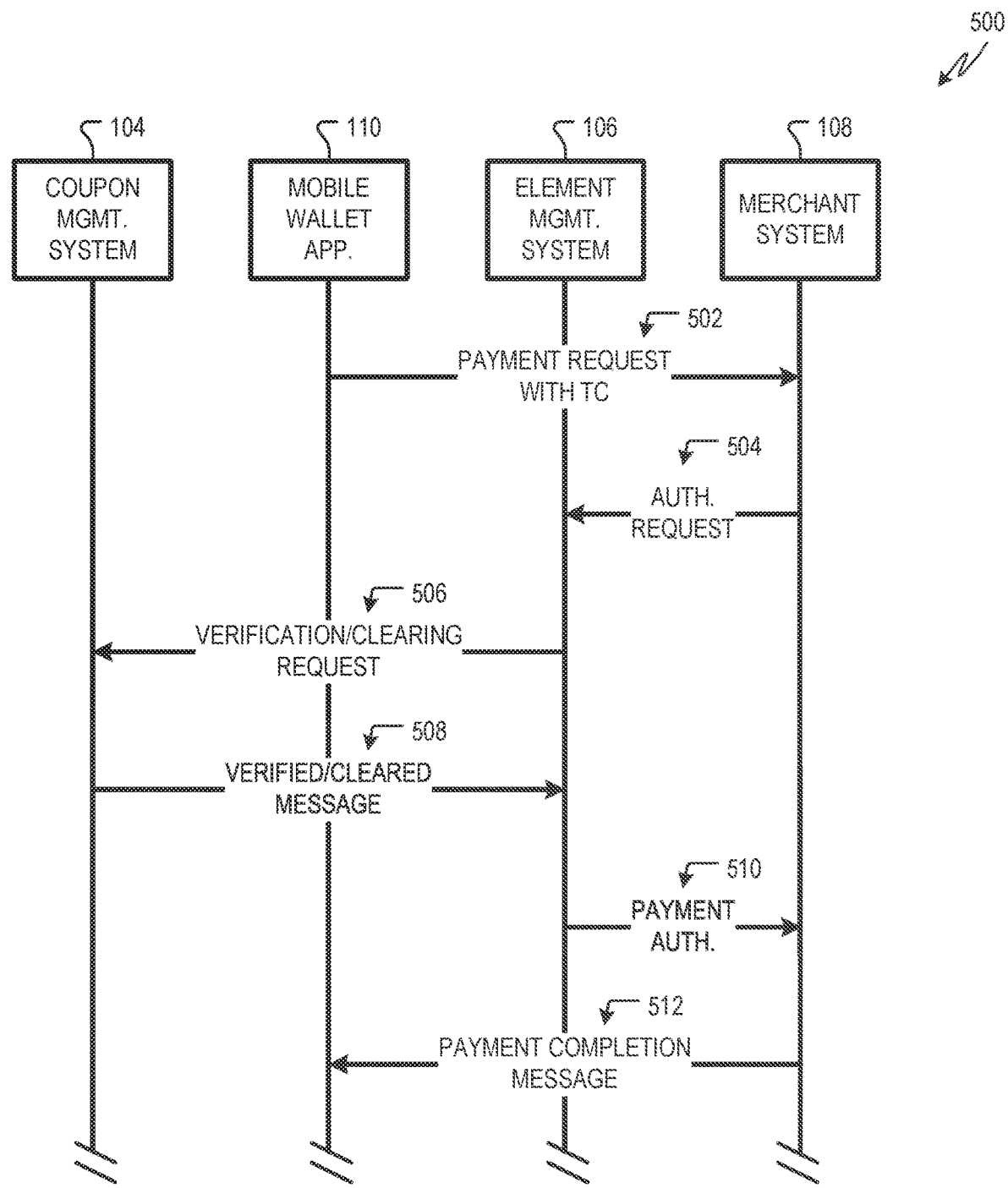
FIG. 5 is a transaction diagram showing one example of a process for utilizing a tokenized coupon data structure as a payment element for a payment.

FIG. 5 is a transaction diagram 500 showing one example of a process for utilizing a tokenized coupon data structure as a payment element for a payment. At operation 502, the mobile wallet application 110 may provide a payment request to the merchant system 108. The payment request may include the tokenized coupon data structure 128. The payment, for example, may be for an offer for which the purchase incentive of the tokenized coupon data structure 128 applies. For example, if the purchase incentive applies to the purchase of a particular product, then the payment may be for a purchase of the product. If the purchase incentive applies to purchases at a particular merchant, then the payment may be for a purchase at the particular merchant.

The merchant system 108 may send an authorization request to the element management system 106 at operation 504. The authorization request, in some examples, may include the tokenized coupon data structure 128. In some examples, the authorization request may be made via the payment network 132, which may route the authorization request to the element management system 106.

The element management system 106 may request verification and/or clearing of the tokenized coupon data structure from the coupon management system 104 at operation 506. In some examples, the verification/clearing request may include the tokenized coupon data structure 128 and/or a portion of it. The coupon management system 104 may receive the verification/clearing request and proceed to verify the tokenized coupon data structure 128, for example, by comparing terms data 202 with cryptographic verification data 208 as described above. The coupon management system 104 may also, in some examples, clear the tokenized coupon data structure 128. For example, the coupon management system 104 may have (or have access to) a record of the creation of the tokenized coupon data structure 128. Provided that the tokenized coupon data structure 128 is verified, the coupon management system 104 may store a record indicating that the tokenized coupon data structure 128 was redeemed.

Provided that the verification and/or clearing is successful, the coupon management system 104 may send a verified/cleared message to the element management system 106 at operation 508. The verified/cleared message may indicate that the tokenized coupon data structure 128 has been verified and/or cleared by the coupon management system 104. In some examples, the element management system 106 may perform its own verification of the tokenized coupon data structure 128. For example, the element management system 106 may compare the credential data 210 to credential data for the payment element 130 indicated by the tokenized coupon data structure 128. In some examples, the element management system 106 may also verify that the requested payment does not exceed an account balance, credit limit, or other limitation on the payment element 130.

Provided that the payment is verified by the element management system 106, the element management system 106 may send a payment authorization message to the merchant system 108 at operation 510. This may indicate to the merchant system 108 that the payment can go forward. The merchant system 108 may also send a payment completion message to the mobile wallet application at operation 512. The payment completion message may indicate that the payment is complete and that the transaction may go forward.

Figure 6:
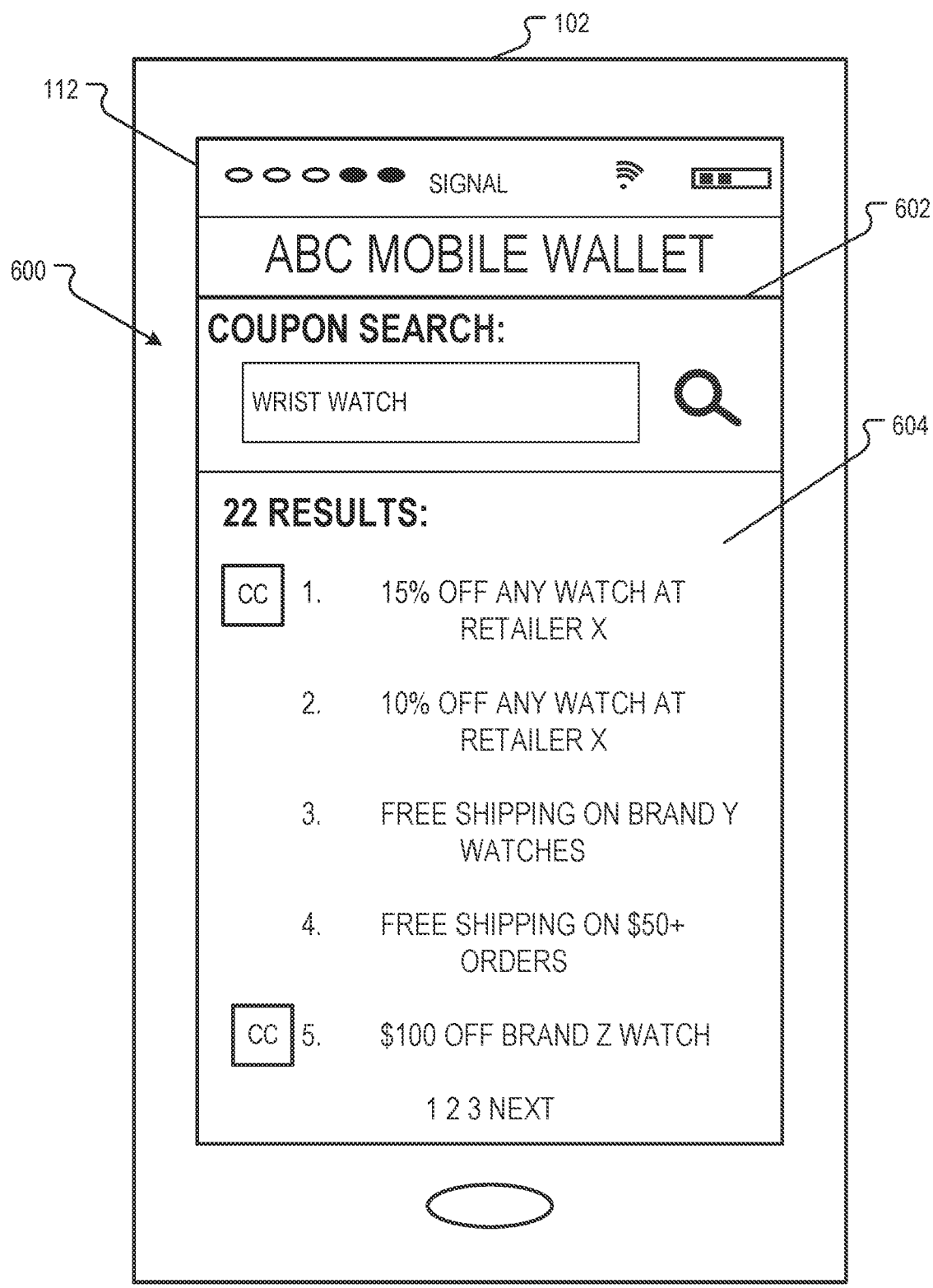
FIG. 6 is a diagram of a user computing device showing one example user interface screen that may be used to allow a user to select purchase incentives.

FIG. 6 is a diagram of the user computing device 102 showing one example user interface screen 600 that may be used to allow the user 101 to select purchase incentives. For example, the mobile wallet application 110 may display the screen 600 at the display 112 of the user computing device 102. The user interface screen 600 includes a search field 602 that may be configured to receive a text or other input field for receiving from the user 101 purchase incentive search data, which may include a criterion or criteria for searching. In the example shown in FIG. 6, the search field 602 includes a field for receiving key words that may be used to search available purchase incentives.

The mobile wallet application 110 may be configured to request or execute a search for available purchase incentives in any suitable manner. In some examples, mobile wallet application 110 may provide the search data to the wallet management system 131 (FIG. 3) which may maintain a list of available purchase incentives. For example, the coupon management system 104 or other suitable system may provide the wallet management system 131 with data describing available purchase incentives. In some examples, the wallet management system 131 may also store purchase incentive data structures that may be used to redeem purchase incentives, such as committable coupon data structures or other data structures for purchase incentives that are not committable. The wallet management system 131 may perform a search based on the received search data and provide results to the mobile wallet application 110.

A results field 604 includes a list of purchase incentives such as, for example, purchase incentives responsive to the search data. In some examples, all of the responsive purchase incentives may have available committable coupon data structures, as described herein. In the example shown in FIG. 6, however, the responsive purchase incentives may include some purchase incentives with available committable coupon data structures (Nos. 1 and 5) as well as others that do not have available committable coupon data structures (Nos. 2, 3, and 4). Purchase incentives that do not have available committable coupon data structures may be available to the mobile wallet application 110 in other forms (e.g., as other types of purchase incentive data structures). In the example of FIG. 6, purchase incentives with committable coupon data structures are indicated by a box with the letters "CC" indicated there, although any other suitable indicator can be used.

The user 101 may select one of the purchase incentives from the results field 604, for example, by selecting the indication of the desired purchase incentive. In response to a selection of a purchase incentive, the mobile wallet application 110 may download the associated purchase incentive data structure. The data structure may be downloaded from the wallet management system 131 and/or another suitable system (e.g., committable coupon data structures may be downloaded from the coupon management system 104 in various examples).

Figure 7:
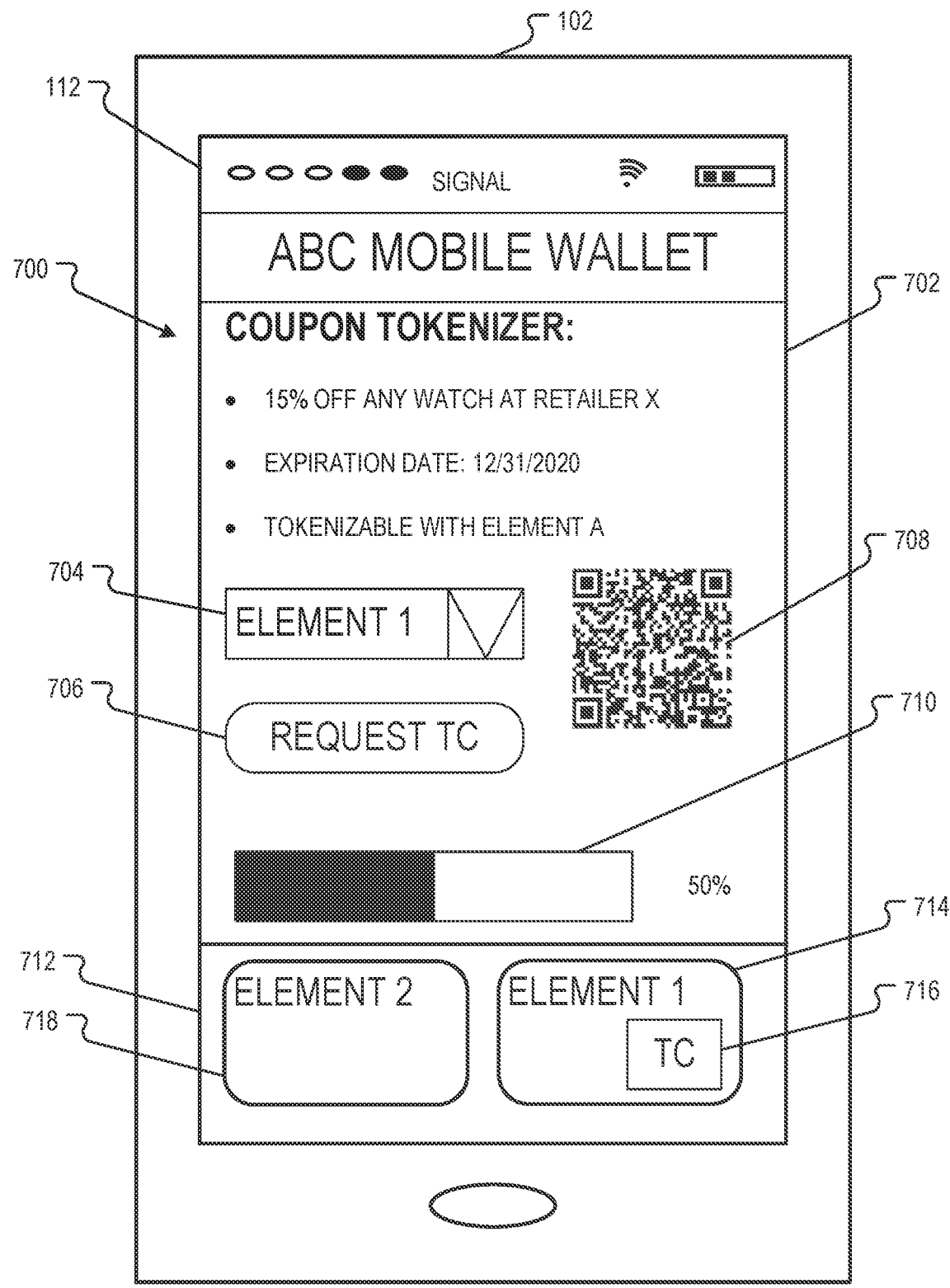
FIG. 7 is a diagram of the user computing device showing another example user interface screen that may be displayed upon selection of a purchase incentive.

FIG. 7 is a diagram of the user computing device 102 showing another example user interface screen 700 that may be displayed upon selection of a purchase incentive. The mobile wallet application 110 may cause the screen 700 to be displayed at the display 112 of the user computing device 102. The screen 700 includes a tokenizer field 702. The tokenizer field 702 may be displayed, for example, upon selection of a committable coupon data structure 120 and may provide the user 101 with the option to tokenize the committable coupon data structure 120. For example, the tokenizer field 702 may include a menu 704 from which the user 101 may select a payment element 130 to be tokenized with the committable coupon data structure 120. In some examples, the committable coupon data structure 120 may be tokenized only with one of a limited set of payment elements. In such an example, the menu 704 may be configured to display only those payment elements that may be tokenized with the selected committable coupon data structure 120. In some examples, a graphical code, such as the QR code 708, may also be displayed. The graphical code may represent some or all of the committable coupon data structure 120, for example, as indicated in FIG. 2. Upon selection of a payment element 130, the user may select a Request TC button 706 to initiate the tokenization process, for example, as described in FIG. 4. An optional progress bar 710 may show the user 101 the progress of the tokenization process.

A payment element field 712 is also shown in FIG. 7. The payment element field 712 may display payment elements that are available to make a payment. For example, two payment element indicators 718, 714 are shown. Payment element indicator 714 may correspond to payment Element 1 (e.g., the payment element selected by the user 101 at the menu 704 above to tokenize with the committable coupon data structure 120). Payment element indicator 718 may correspond to another payment element called Element 2. If other payment elements are available, additional indicators for those elements may be shown.

The payment element indicator 714 may include a tokenized coupon button 716. In some examples, the payment element field 712 may be displayed when the user 101 requests a payment utilizing the mobile wallet application 110, for example, indicating that the tokenized coupon data structure 128 and other payment elements are usable for making the payment. In some examples, the mobile wallet application 110 may determine whether the requested payment is for a purchase for which the purchase incentive may be redeemed. If yes, the mobile wallet application 110 may display the tokenized coupon button 716. If the requested payment is not for a purchase for which the purchase incentive may be redeemed, in some examples, the mobile wallet application 110 may not display the tokenized coupon button 716. The user 101 may select the indicator associated with the payment element that the user 101 is to use to make the payment request. In some examples, the user may select the tokenized coupon button 716 to use a tokenized coupon data structure as the payment element for a payment request. In some examples the mobile wallet application may communicate with the merchant system and determine if there is an applicable tokenized coupon for the item to be purchased. If there is a match, the mobile wallet may pop a window to ask if the user wants to submit the tokenized coupon or may submit the tokenized coupon automatically.

In some examples, the coupon management system 104 may provide additional incentives to users who transfer purchase incentive data structures to other users. For example, the coupon management system 104 may modify the purchase incentive associated with a purchase incentive data structure upon determining that another user received the committable coupon data structure 120 from the first user and tokenized it and/or used it in a payment transaction.

Figure 8:
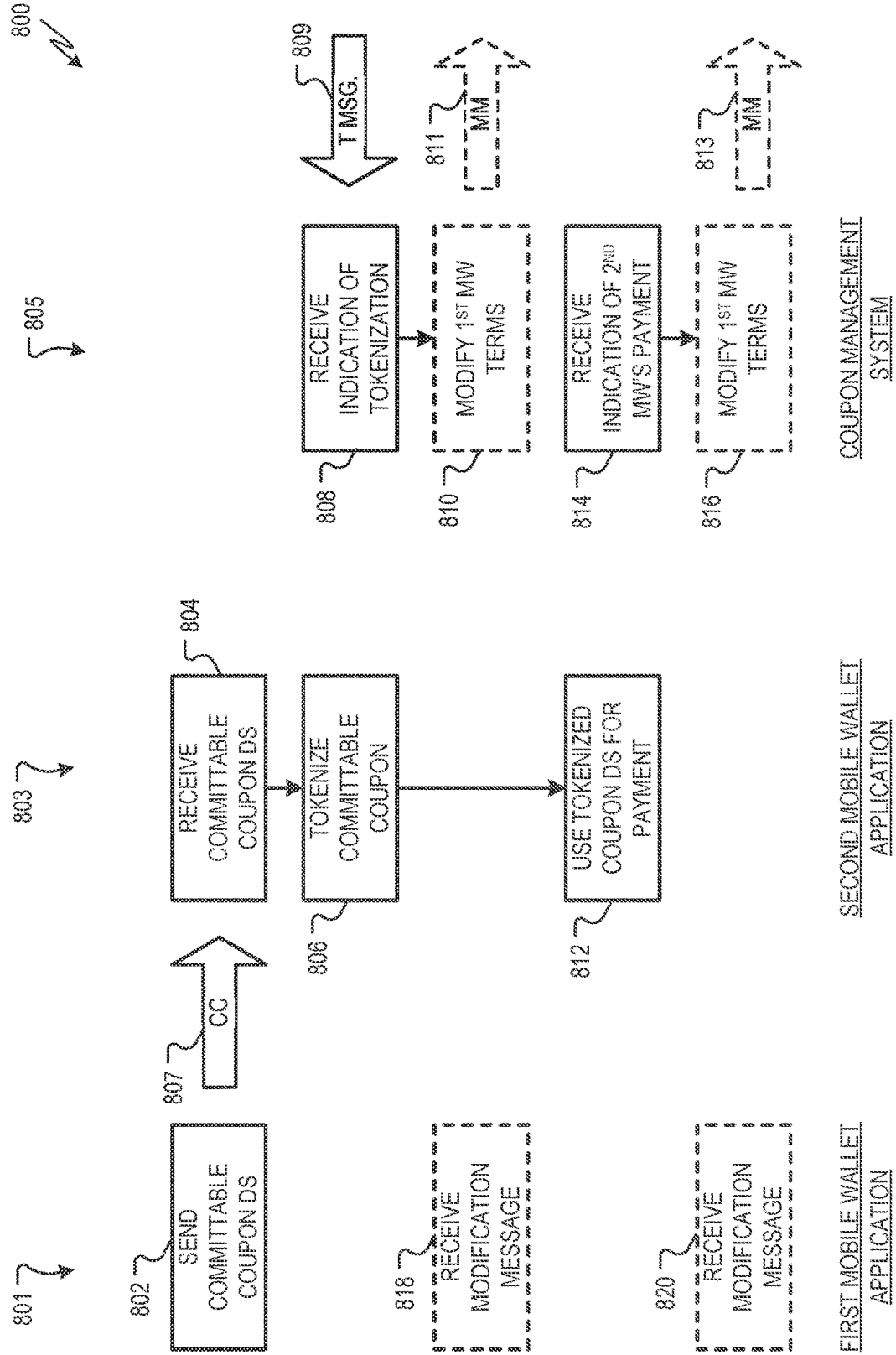
FIG. 8 is a flowchart showing one example of a process flow that may be executed by mobile wallet applications and a coupon management system to provide incentives to users who distribute committable coupon data.

FIG. 8 is a flowchart showing one example of a process flow 800 that may be executed by mobile wallet applications (e.g., application 110) and a coupon management system (e.g., system 104) to provide incentives to users who distribute committable coupon data. The flowchart of FIG. 8 includes three columns 801, 803, 805 indicating operations that may be performed by a first mobile wallet application (column 801), a second mobile wallet application (column 803) and a coupon management system (column 805).

At operation 802, the first mobile wallet application may send a committable coupon data structure 807 to the second mobile wallet application, which may receive the committable coupon data structure 807 at operation 804. The committable coupon data structure 807 may be transmitted in any suitable manner. In some examples, the committable coupon data structure 807 may be sent via e-mail (e.g., to an e-mail address of the second mobile wallet application or a user thereof). In some examples, the committable coupon data structure 807 may be sent via a secure wallet-to-wallet communication technique, such as the one described herein at FIGS. 9 and 10. In some examples, the first mobile wallet application may send the committable coupon data structure 807 by displaying a graphical code, such as the QR code 708. A user computing device executing the second mobile wallet application may capture an image of the QR code 708 and decode the image to derive the committable coupon data structure 807. In some examples, the first mobile wallet application maintains a copy of the transferred committable coupon data structure 807. The first mobile wallet application may send the committable coupon data structure 807 before or after the first mobile wallet application has tokenized the committable coupon data structure 807 to form a tokenized coupon data structure with a payment element of the first mobile wallet application.

In some examples, before sending the committable coupon data structure 807, the first mobile wallet application may "sign" or otherwise indicate that the first mobile wallet application has provided the committable coupon data structure 807 to the second mobile wallet application. For example, the first mobile wallet application may cryptographically sign the committable coupon data structure 807 before sending it to the second mobile wallet application.

At operation 806, the second mobile wallet application may tokenize the committable coupon data structure 807, for example, as described herein. Upon, or during, tokenization, the coupon management system may receive (at operation 808) a message 809 indicating that the committable coupon data structure provided to the second mobile wallet application is being tokenized. For example, the message 809 may be a request from an element management system that the coupon management system verify the committable coupon data structure. In some examples, the coupon management system may identify the first mobile wallet application from the message 809. For example, the message 809 may include the committable coupon data structure 807 which may have been signed by the first mobile wallet application as described herein.

Optionally, at operation 810, the coupon management system, upon determining that the second mobile wallet application has tokenized the committable coupon data structure 807, may modify the purchase incentive available to the first mobile wallet application. For example, the coupon management system may send a modification message 811 to the first mobile wallet application, which may receive the same at operation 818. The modification message 811 may include a modification to the purchase incentive indicated by the committable coupon data structure 807. For example, the modification may be available to the first mobile wallet application only. The modification may include, for example, replacements or modifications to the terms data 202 or cryptographic verification data 208 of the committable coupon data structure held by the first mobile wallet application. In some examples where the first mobile wallet application has already tokenized the committable coupon data structure, the modification message 811 may include replacements or modifications to the terms data 202 and/or cryptographic verification data 208 of the resulting tokenized coupon data structure. Also, in some examples, the modification message 811 may include a new committable coupon data structure with terms data 202 and/or cryptographic verification data 208 indicating the modified purchase incentive.

At operation 812, the second mobile wallet application may make a payment utilizing the tokenized coupon data structure generated from the committable coupon data structure 807. For example, the second mobile wallet application may redeem the purchase incentive associated with the purchase incentive data structures. At operation 814, the coupon management system may receive an indication of the payment at operation 812. Optionally, at operation 816, the coupon management system may make a further modification to the terms of the purchase incentive for the first mobile wallet application. For example, the coupon management system may send a modification message 813, which may be similar to the modification message 811. The first mobile wallet application may receive the modification message 813 at operation 820.

As shown in FIG. 8, the coupon management system modifies the purchase incentive of the first mobile wallet application when the second mobile wallet application tokenizes the received committable coupon data structure 807, and when the second mobile wallet application makes a payment using the resulting tokenized coupon data structure. The modifications may make the purchase incentive more favorable to the first mobile wallet application, for example, by allowing a bigger discount, a lower price, a wider range of offers for which the incentive may be redeemed, etc. This may provide an incentive for the user of the first mobile wallet application to distribute the committable coupon data structure 807 to other mobile wallet applications that are likely to tokenize and/or redeem the associated purchase incentive. Although the coupon management system modifies the first mobile wallet application's purchase incentive terms after both the tokenization and the redemption of the committable coupon data structure and tokenized computing data structure, in some examples, the coupon management system may modify the terms of the first mobile wallet application's purchase incentive after less than all of these events.

Figure 9:
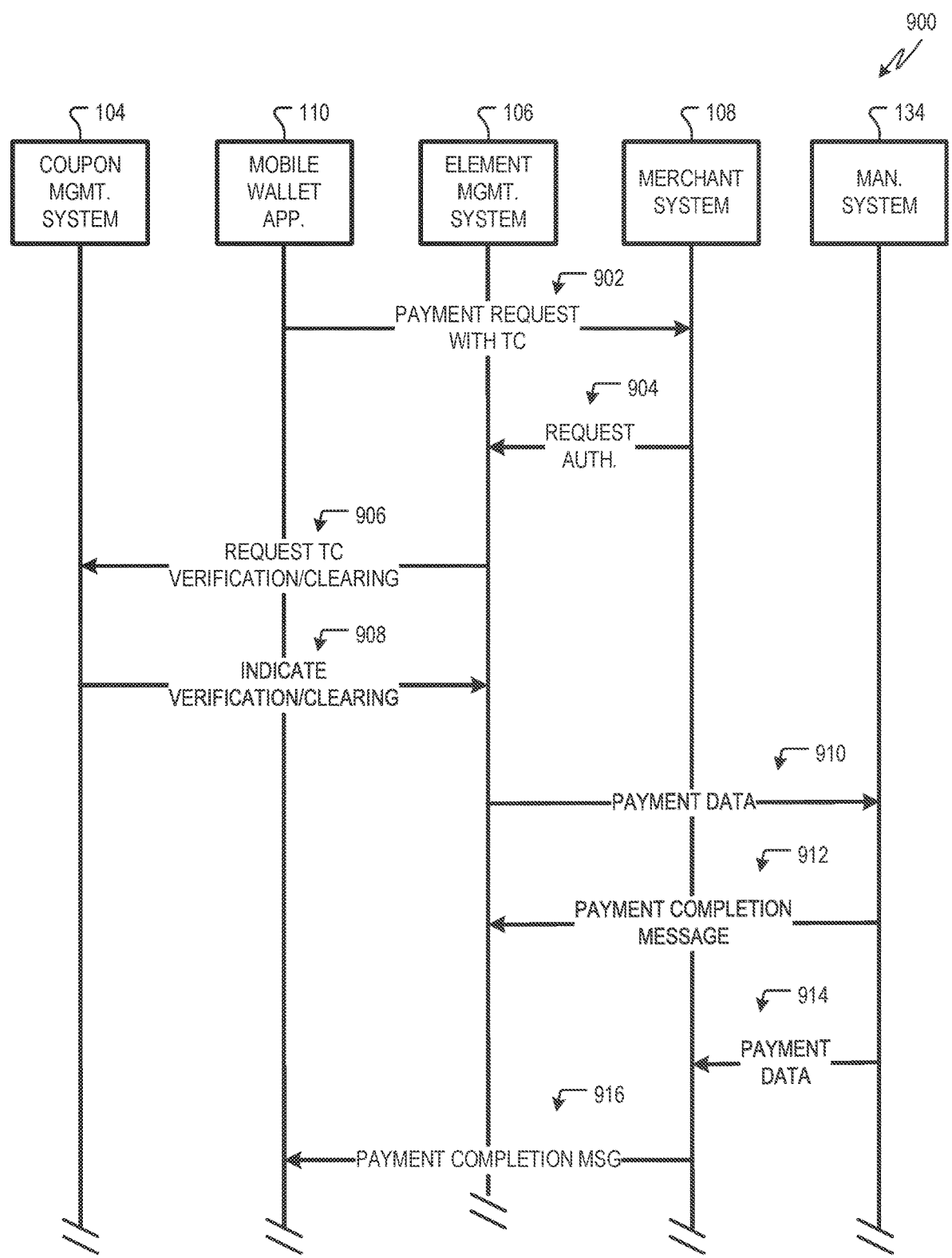
FIG. 9 is a transaction diagram showing one example of a process for utilizing a tokenized coupon data structure as a payment element for an offer in a payment structure including a manufacturer system.

In some examples, purchase incentive data structures, as described herein, may be utilized to implement different payment structures for an offer of goods or services. For example, FIG. 9 is a transaction diagram 900 showing one example of a process for utilizing a tokenized coupon data structure as a payment element for an offer in a payment structure including a manufacturer system 134. The manufacturer system 134 may be, for example, the manufacturer of a good or provider of a service. In this example, the merchant system 108 may be associated with a retailer selling the goods or services provided by the manufacturer.

At operation 902, the mobile wallet application 110 may provide a payment request to the merchant system 108. The payment request may include the tokenized coupon data structure 128. The payment, for example, may be for a purchase that redeems the purchase incentive of the tokenized coupon data structure 128. For example, if the purchase incentive applies to the purchase of a particular product, then the payment may be for a purchase of the product. If the purchase incentive applies to purchases at a particular merchant or manufacturer, then the payment may be for a purchase at the particular merchant.

The merchant system 108 may send an authorization request to the element management system 106 at operation 904. The authorization request, in some examples, may include the tokenized coupon data structure 128. In some examples, the authorization request may be made via the payment network 132, which may route the authorization request to the element management system 106.

The element management system 106 may request verification and/or clearing of the tokenized coupon data structure from the coupon management system 104 at operation 906. In some examples, the verification/clearing request may include the tokenized coupon data structure 128 and/or a portion of it. The coupon management system 104 may receive the verification/clearing request and proceed to verify the tokenized coupon data structure 128, for example, by comparing terms data 202 with cryptographic verification data 208 as described above. The coupon management system 104 may also, in some examples, clear the tokenized coupon data structure 128. For example, the coupon management system 104 may have (or have access to) a record of the creation of the tokenized coupon data structure 128. Provided that the tokenized coupon data structure 128 is verified, the coupon management system 104 may store a record indicating that the tokenized data structure was redeemed.

Provided that the verification and/or clearing is successful, the coupon management system 104 may send a verified/cleared message to the element management system 106 at operation 908. The verified/cleared message may indicate that the tokenized coupon data structure 128 has been verified and/or cleared by the coupon management system 104. In some examples, the element management system 106 may perform its own verification of the tokenized coupon data structure 128. For example, the element management system 106 may compare the credential data 210 to credential data for the payment element indicated by the tokenized coupon data structure 128. In some examples, the element management system 106 may also verify that the requested payment does not exceed an account balance, credit limit, or other limitation on the payment element.

Provided that the payment is verified by the element management system 106, the element management system 106 may send payment data to the manufacturer system 134 at operation 910. The payment data may provide the payment to the manufacturer system 134 (or a financial account associated therewith). The manufacturer system 134 may provide the element management system 106 with a payment completion message at 912, indicating that the payment at operation 910 is received. The manufacturer system 134 may then send additional payment data to the merchant system 108 at operation 914. The other payment data may indicate a separate payment to the merchant system 108, which provides the merchant system 108 a merchant portion of the original payment as compensation for selling the underlying offer of goods or services. The merchant system may send a payment completion message to the mobile wallet application 110 at operation 916. The payment completion message may indicate that the payment is complete and that the transaction may go forward.

Figure 10:
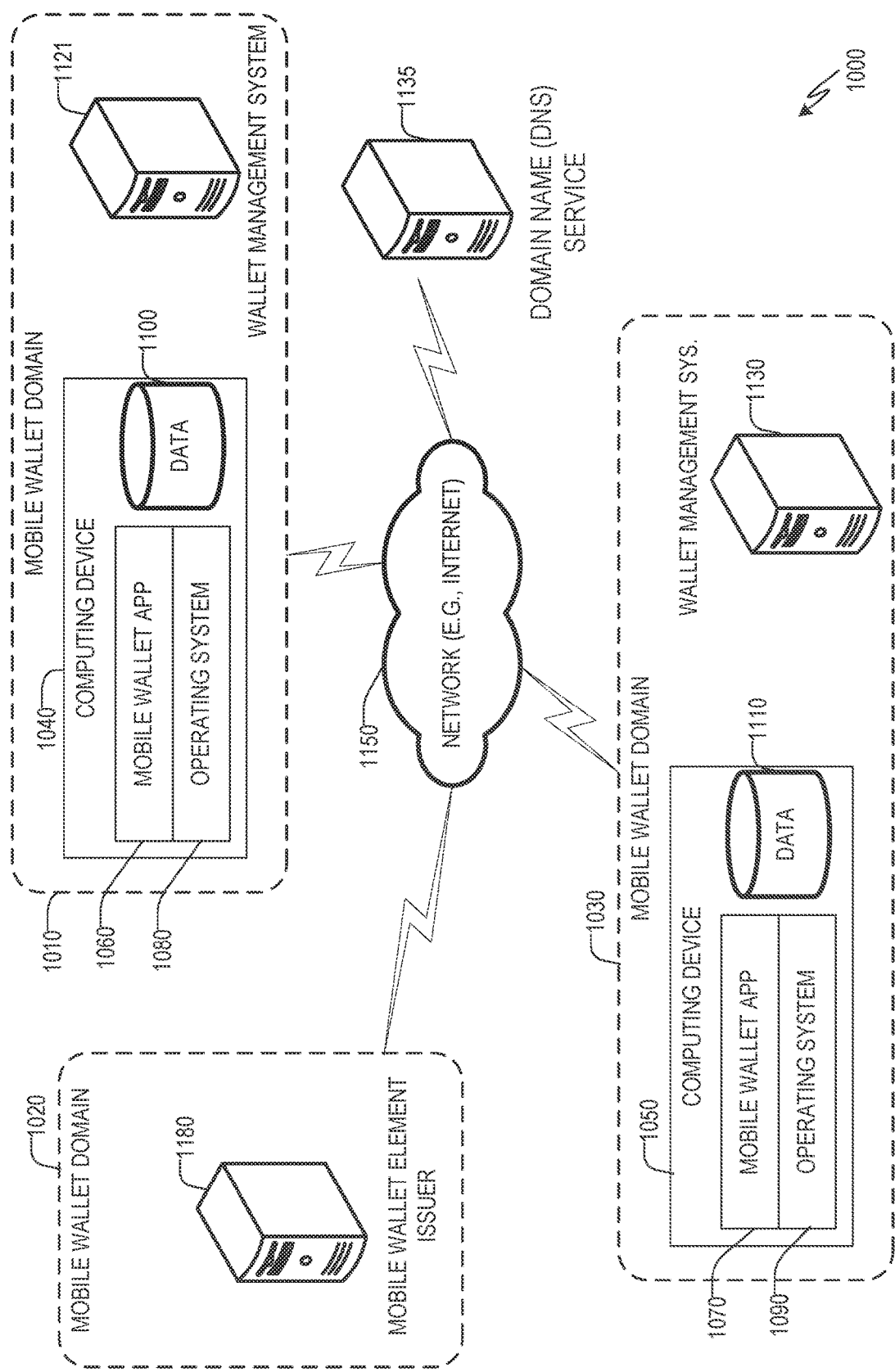
FIG. 10 is a diagram showing one example of an environment for secure digital communication between mobile wallet applications.

FIG. 10 is a diagram showing one example of an environment 1000 for secure digital communication between mobile wallet applications. For example, the components and techniques described with respect to FIG. 10 may be utilized in any of the methods and systems described herein. For example, the environment 1000 illustrates example ways that mobile wallet applications may transfer committable coupon data structures, for example, as described with respect to FIG. 8. In the example environment 1000, three mobile wallet domains 1010, 1020, and 1030 are shown. Mobile wallet domains 1010 and 1030 include two respective user computing devices 1040 and 1050 with mobile wallet applications 1060 and 1070 executing along with operating systems 1080 and 1090 respectively. Mobile wallet domains may be provided by one or more mobile wallet providers (e.g., mobile wallet providers implementing the respective wallet management systems 1121, 1130). Mobile wallet providers may administer one or more mobile wallet domains. The mobile wallet applications 1060 and 1070 may originate from the wallet management systems 1121 and 1130 respectively. Wallet management systems 1121, 1130, in some examples, may operate similarly to the wallet management system 131 described herein. Similarly, mobile wallet applications 1060, 1070 may operate in a manner similar to the mobile wallet application 110 described herein.

Mobile wallet applications 1060 and 1070 store one or more data structures that store digital representations of payment and non-payment elements of the user. In some examples, this may be identification information (drivers licenses), financial information (credit card information, bank card information, bank account information), and the like. A digital representation may include one or more information fields stored by the mobile wallet and providing information about the user (e.g., account number, user age, user name, and the like) and in some cases verification (e.g., a certificate or other means to assure that the digital representation is authentic). Operating systems 1080 and 1090 provide services to the mobile wallets (and other applications) on the computing devices 1040 and 1050 such as scheduling tasks for execution, controlling peripherals, providing an interface to the hardware, managing memory, and the like.

Computing devices 1040 and 1050 may also contain data storage devices 1100 and 1110 that may store mobile wallet application data, including mobile wallet messages, encryption keys, address books, data structures storing information about the user of the computing device (such as information on payment and non-payment elements of the mobile wallet), and the like. Mobile wallet domains 1010 and 1030 may have wallet management systems 1121 and 1130 that provide mobile wallet communication services to the mobile wallets within their respective mobile wallet domains 1010 and 1030. Example services include message forwarding, message storage, message encryption, and the like.

Domain Name Service (DNS) 1135 translates a domain name (e.g., abc.mwallet) to an Internet Protocol (IP) address that may be utilized to send messages to that mobile wallet domain. Mobile wallet domains 1010, 1020, 1030, and DNS 1135 may communicate over computer network 1150, which in some examples may be or include the Internet. Mobile wallet domain 1020 may include mobile wallet element issuer 1180. Mobile wallet element issuer 1180 may contain applications which may communicate with mobile wallets in other mobile wallet domains according to the present disclosure. Example mobile wallet issuers include banks, merchants, government organizations, corporations, or the like.

Mobile wallet element issuer 1180 may issue one or more identification cards, credit cards, bank cards, bank accounts, or the like to one or more users of mobile wallets (e.g., mobile wallet applications 1060 and 1070). Mobile wallet element issuer 1180 may include one or more of the components of wallet management systems 1121 and 1130 as shown in FIG. 2 (e.g., PKS, MTA, MSA). In some examples, these elements may be issued by sending the digital representations to one or more mobile wallet recipients. Thus, using the disclosed techniques, it may be possible to automatically provision and populate a mobile wallet with little consumer effort.

Figure 11:
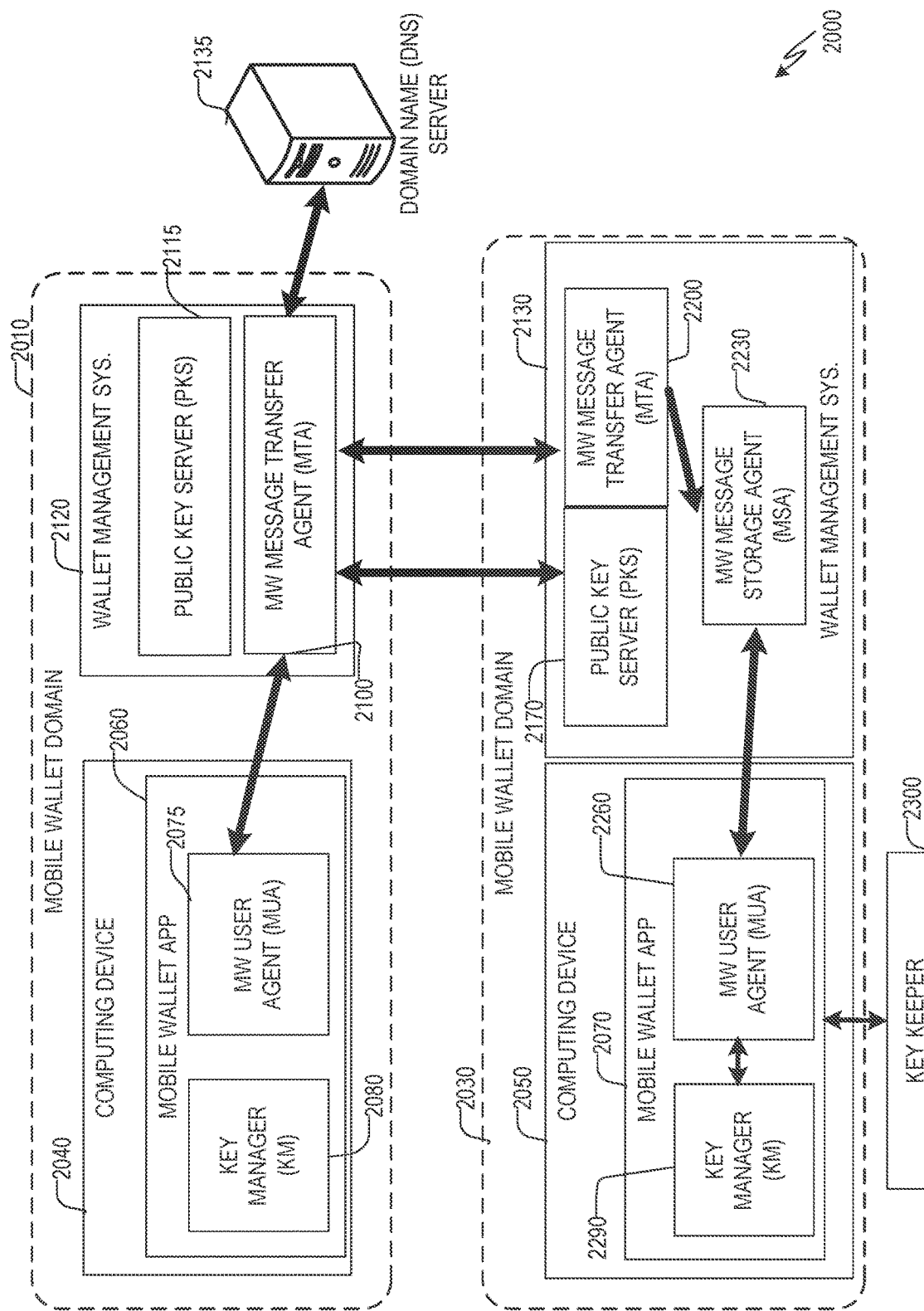
FIG. 11 is a diagram showing one example of a mobile wallet to mobile wallet secure digital communication.

FIG. 11 is a diagram showing one example of a mobile wallet to mobile wallet secure digital communication 2000. Mobile wallet domain 2010 may be an example implementation of mobile wallet domain 1010, and mobile wallet domain 2030 may be an example implementation of mobile wallet domain 1030 of FIG. 10. Similarly, computing device 2040, mobile wallet application 2060, and wallet management system 2120 may be an example implementation of computing device 1040, mobile wallet application 1060 and wallet management system 1121 respectively of FIG. 10 in some examples. Computing device 2050, mobile wallet application 2070, and wallet management system 2130 may be an example implementation of computing device 1050, mobile wallet application 1070, and wallet management system 1130, respectively, of FIG. 10 according to some examples.

A first mobile wallet application 2060 executing on a computing device 2040 in a first mobile wallet domain 2010 is sending a message to a second mobile wallet application 2070 executing on a second computing device 2050 in a second mobile wallet domain 2030. Mobile wallet application 2060 may include a mobile wallet user agent (MUA) 2075 and a key manager (KM) 2080. The MUA 2075 allows users to compose, send, and retrieve mobile wallet (MW) messages. Key manager 2080 may do one or more of: create, provision, registers, stores, and manages one or more cryptographic keys. Key manager 2080 may register (or obtain) a public key with a certificate authority (not shown for clarity) and with a PKS 2115.

A mobile wallet application 2060 may provide one or more graphical user interfaces (UI)s to allow users to compose and edit one or more mobile wallet messages. Before sending a message, the MUA 2075 requests the recipient's public key from the MTA 2100. The PKS 2115 and MTA 2100 may be provided by the wallet management system 2120 of the mobile wallet domain 2010. The PKS 2115 and MTA 2100 may be provided by the same computing device, or different computing devices. While the PKS 2115 and MTA 2100 are shown as part of the wallet management system 2120, they may be provided by separate entities. The MTA 2100 and PKS 2115 are accessible to computing device 2040 and other computing devices both within the mobile wallet domain 2010 and other devices within other mobile wallet domains, over one or more networks (not shown for clarity). These networks may include one or more portions of: Local Area Networks (LAN), Wide Area Networks (WAN), Metropolitan Area Networks (MAN), the Internet, cellular networks, and the like.

The MTA 2100 first examines the message to determine which mobile wallet domain the recipient is in. If the mobile wallet domain is mobile wallet domain 2010, the MTA 2100 may retrieve the public key from the PKS 2115 of mobile wallet domain 2010. If the mobile wallet domain is in another domain, then the MTA 2100 checks its DNS cache to determine if it already knows the IP address of the recipient mobile wallet domain's PKS. If the mobile wallet domain is not in the DNS cache, the MW sends a lookup message to DNS server 2135 using the Domain Name System Protocol. DNS server 2135 responds with an IP address of the mobile wallet domain (or an error). Once the address is determined (either through the cache or the DNS server 2135), the MTA 2100 sends a message to the PKS 2170 asking for the public key of the recipient mobile wallet (e.g., mobile wallet application 2070). The response includes the recipient's public key. The public key is then passed by the MTA 2100 to the MUA 2075.

In some examples, the public key is passed to the MTA 2100 in the form of a digital certificate issued by a Certificate Authority (CA). A digital certificate typically includes the name and other identification information of the holder, the holder's public key, the name of the CA, a serial number, and a validity period. The information in the digital certificate is signed by the issuing CA using the issuing CA's private key. The signature can be verified using the CA's public key (which is known and may be pre-installed on the computing devices). This may serve as a means to verify that the public key is owned by the recipient. For example, the PKS 2170 may provide a digital certificate created by a trusted CA for the recipient mobile wallet application 2070 in response to the request for the recipient's public key. MUA 2075 (or MTA 2100) may utilize the CA's public key and decrypt the certificate. The certificate may then be checked to determine that the message was not tampered with, and that the public key therein belongs to the mobile wallet application 2070 (e.g., authentication and verification).

Once the MUA 2075 is satisfied with the public key, the MUA 2075 then encrypts the contents of the message with the received public key and sends it to the MTA 2100. The MTA 2100 determines the IP address of the recipient mobile wallet domain's MTA 2200. In some examples, the MTA 2100 utilizes the IP address previously determined from the DNS server 2135 (e.g., using the cache) when retrieving the public key of the recipient. For example, the PKS 2170 and MTA 2200 may have the same IP address, or the IP address of the MTA 2200 may be derivable from the IP address of the PKS 2170. In other examples a mobile wallet application in mobile wallet domain 2010 may have previously communicated with a mobile wallet in mobile wallet domain 2030 (and thus the MTA 2100 still has the IP address in its cache). In other examples, the MTA 2100 may re-request the IP address from the DNS server 2135.

The MTA 2100 then sends the message to the MTA 2200 of the wallet management system 2130 of the recipient mobile wallet domain 2030 using the determined IP address. MTA 2200 may send a response to MTA 2100 (which may be forwarded to MUA—but this message is not shown for clarity). MTA 2200 may then send the message to the mobile wallet message storage agent (MSA) 2230. Note that the wallet management system 2120 may also employ a MSA, but it is not shown for clarity. MSA 2230 may then store the message and alert the MUA 2260 of the recipient mobile wallet application 2070 using a notification. When the MUA is interested in receiving the message, the MUA may request it and the MSA may provide it. The MUA may decrypt the message using its private key. The private key may be maintained in the key manager 2290. Key manager 2290 may communicate with key keeper 2300. Key keeper 2300 may be a remote key storage facility to prevent the loss of the cryptographic keys should the computing device 2050 experience a loss in data. For example, the key manager 2290 may store one or more keys of the mobile wallet application 2070 in the key keeper 2300.

In some examples, the mobile wallet application 2070 may utilize a second cryptographic key to encrypt the private key. The private key may then be stored with the wallet management system 2130 in encrypted form. The second cryptographic key may then be stored with the key keeper 2300 and utilized to decrypt the private key should the computing device 2050 need it. The key keeper 2300 may be under control of the user of computing device 2050. This ensures that the private key is not given to the wallet management system 2130 and thus the user can entrust that no one associated with the wallet management system 2130 can access their messages.

Figure 12:
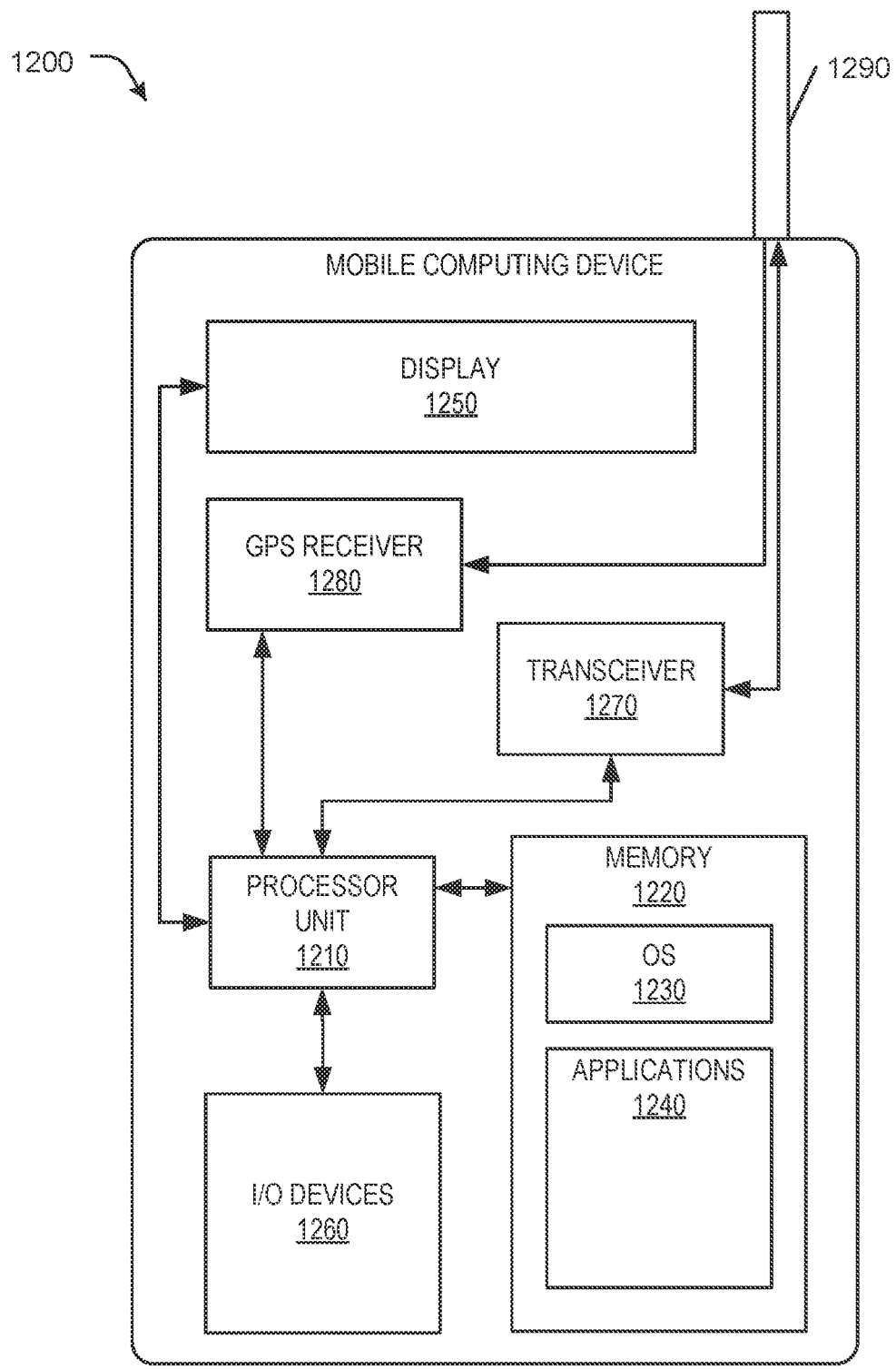
FIG. 12 is a block diagram showing an example architecture of a user computing device.

FIG. 12 is a block diagram showing an example architecture 1200 of a user computing device. For example, the architecture 1200, for example, may describe any of the computing devices described. The architecture 1200 comprises a processor unit 1210. The processor unit 1210 may include one or more processors. Any of a variety of different types of commercially available processors suitable for user computing devices may be used (for example, an XScale architecture microprocessor, a Microprocessor without Interlocked Pipeline Stages (MIPS) architecture processor, or another type of processor). A memory 1220, such as a Random Access Memory (RAM), a Flash memory, or other type of memory or data storage, is typically accessible to the processor. The memory 1220 may be adapted to store an operating system (OS) 1230, as well as application programs 1240.

The processor unit 1210 may be coupled, either directly or via appropriate intermediary hardware, to a display 1250 and to one or more input/output (I/O) devices 1260, such as a keypad, a touch panel sensor, a microphone, and the like. Such I/O devices 1260 may include a touch sensor for capturing fingerprint data, a camera for capturing one or more images of the user, a retinal scanner, or any other suitable devices. Similarly, in some examples, the processor unit 1210 may be coupled to a transceiver 1270 that interfaces with an antenna 1290. The transceiver 1270 may be configured to both transmit and receive cellular network signals, wireless data signals, or other types of signals via the antenna 1290, depending on the nature of the user computing device implemented by the architecture 1200. Although one transceiver 1270 is shown, in some examples, the architecture 1200 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a GPS receiver 1280 may also make use of the antenna 1290 to receive GPS signals. In addition to or instead of the GPS receiver 1280, any suitable location-determining sensor may be included and/or used including, for example, a Wi-Fi positioning system. In some examples, the architecture (e.g., processor unit 1210) may also support a hardware interrupt. In response to a hardware interrupt, the processor unit 1210 may pause its processing and execute an interrupt service routine (ISR).

Figure 13:
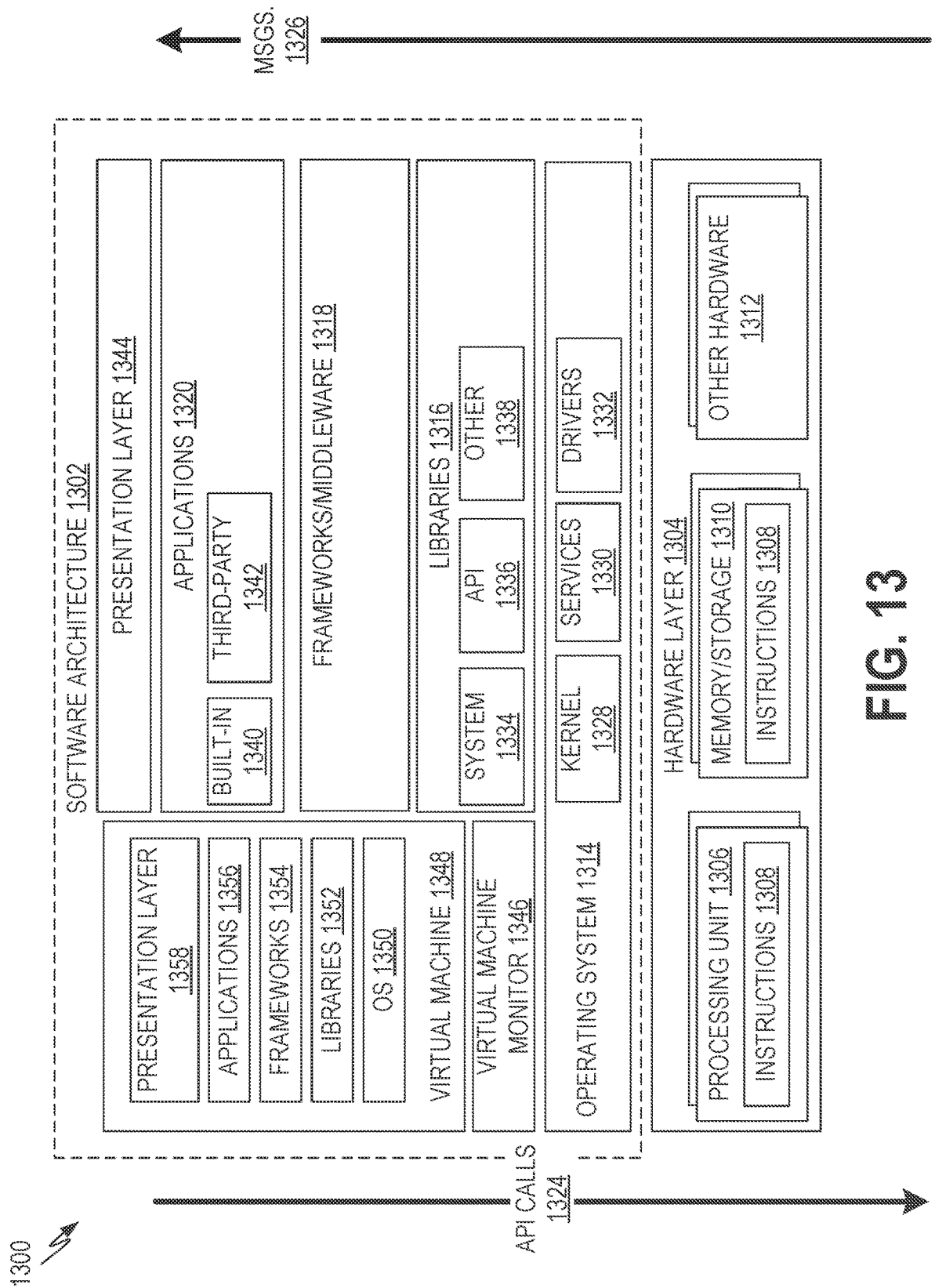
FIG. 13 is a block diagram showing one example of a software architecture for a computing device.

FIG. 13 is a block diagram 1300 showing one example of a software architecture 1302 for a computing device. The architecture 1302 maybe used in conjunction with various hardware architectures, for example, as described herein. FIG. 13 is merely a non-limiting example of a software architecture 1302 and many other architectures may be implemented to facilitate the functionality described herein. A representative hardware layer 1304 is illustrated and can represent, for example, any of the above referenced computing devices. In some examples, the hardware layer 1304 may be implemented according to the architecture 1302 of FIG. 13 and/or the architecture 1400 of FIG. 14.

The representative hardware layer 1304 comprises one or more processing units 1306 having associated executable instructions 1308. Executable instructions 1308 represent the executable instructions of the software architecture 1302, including implementation of the methods, modules, components, and so forth of FIGS. 1-8. Hardware layer 1304 also includes memory and/or storage modules 1310, which also have executable instructions 1308. Hardware layer 1304 may also comprise other hardware as indicated by other hardware 1312, which represents any other hardware of the hardware layer 1304, such as the other hardware illustrated as part of hardware architecture 1400.

In the example architecture of FIG. 13, the software 1302 may be conceptualized as a stack of layers where each layer provides particular functionality. For example, the software 1302 may include layers such as an operating system 1314, libraries 1316, frameworks/middleware 1318, applications 1320 and presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide a frameworks/middleware layer 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. In some examples, the services 1330 include an interrupt service. The interrupt service may detect the receipt of a hardware or software interrupt and, in response, cause the architecture 1302 to pause its current processing and execute an interrupt service routine (ISR) when an interrupt is received. The ISR may generate the alert, for example, as described herein.

The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. Third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other user computing device operating systems. In this example, the third-party application 1342 may invoke the API calls 1324 provided by the mobile operating system such as operating system 1314 to facilitate functionality described herein.

The applications 1320 may utilize built-in operating system functions (e.g., kernel 1328, services 1330 and/or drivers 1332), libraries (e.g., system 1334, APIs 1336, and other libraries 1338), frameworks/middleware 1318 to create user interfaces to interact with users of the system. Alternatively, or additionally, in some systems, interactions with a user may occur through a presentation layer, such as presentation layer 1344. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 13, this is illustrated by virtual machine 1348. A virtual machine creates a software environment where applications/modules can execute as if they were executing on a hardware computing device. A virtual machine is hosted by a host operating system (operating system 1314) and typically, although not always, has a virtual machine monitor 1346, which manages the operation of the virtual machine 1348 as well as the interface with the host operating system (i.e., operating system 1314). A software architecture executes within the virtual machine 1348 such as an operating system 1350, libraries 1352, frameworks/middleware 1354, applications 1356 and/or presentation layer 1358. These layers of software architecture executing within the virtual machine 1348 can be the same as corresponding layers previously described or may be different.

Figure 14:
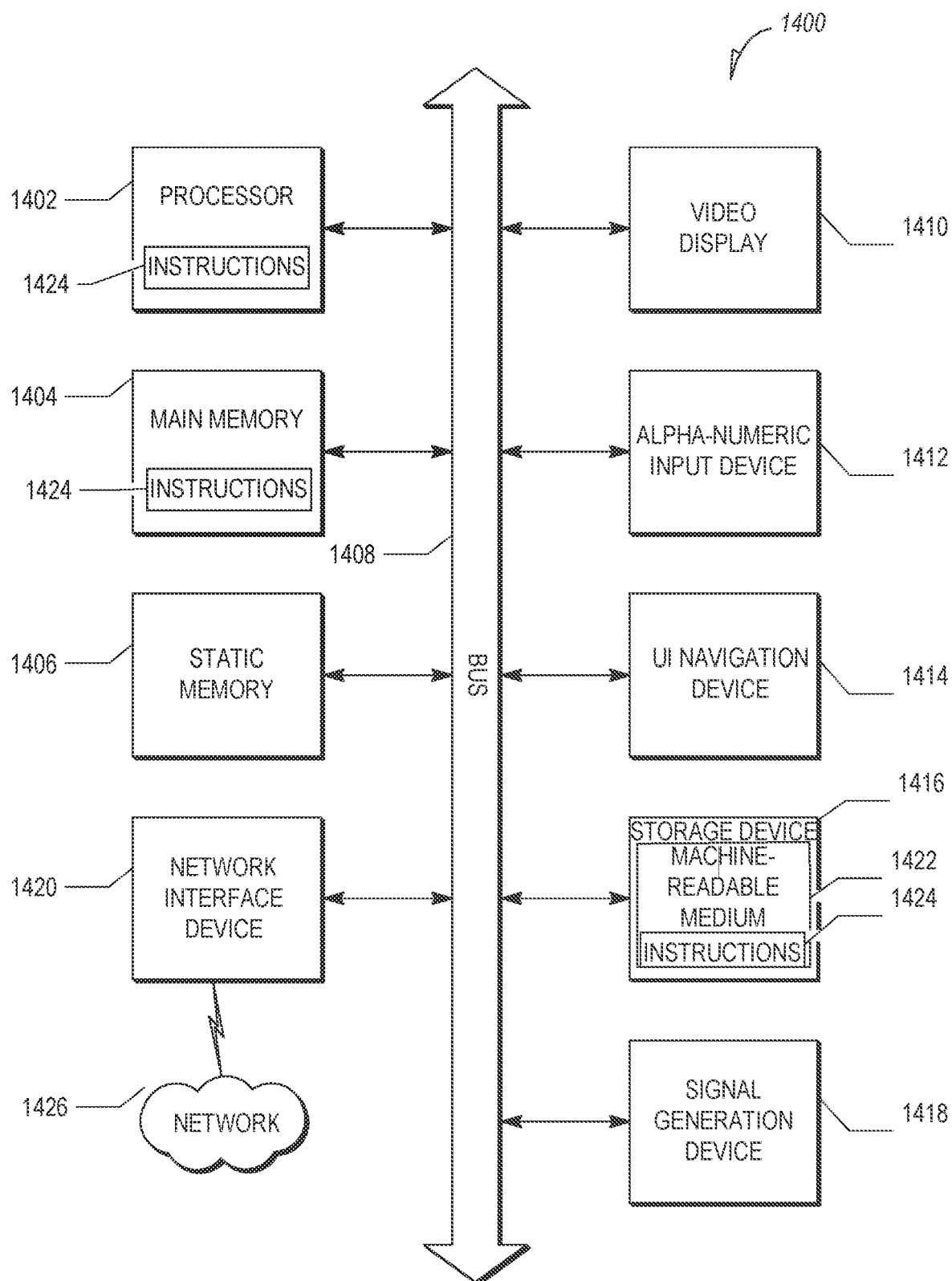
FIG. 14 is a block diagram illustrating a computing device hardware architecture, within which a set or sequence of instructions can be executed to cause the machine to perform examples of any one of the methodologies discussed herein.

FIG. 14 is a block diagram illustrating a computing device hardware architecture 1400, within which a set or sequence of instructions can be executed to cause the machine to perform examples of any one of the methodologies discussed herein. For example, the architecture 1400 may execute the software architecture 1302 described with respect to FIG. 13. The architecture 1400 may operate as a standalone device or may be connected (e.g., networked) to other machines. In a networked deployment, the architecture 1400 may operate in the capacity of either a server or a client machine in server-client network environments, or it may act as a peer machine in peer-to-peer (or distributed) network environments. The architecture 1400 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 1400 includes a processor unit 1402 comprising at least one processor (e.g., a central processing unit (CPU), a graphics processing unit (GPU) or both, processor cores, compute nodes, etc.). The architecture 1400 may further comprise a main memory 1404 and a static memory 1406, which communicate with each other via a link 1408 (e.g., bus). The architecture 1400 can further include a video display unit 1410, an alphanumeric input device 1412 (e.g., a keyboard), and a user interface (UI) navigation device 1414 (e.g., a mouse). In some examples, the video display unit 1410, input device 1412, and UI navigation device 1414 are incorporated into a touch screen display. The architecture 1400 may additionally include a storage device 1416 (e.g., a drive unit), a signal generation device 1418 (e.g., a speaker), a network interface device 1420, and one or more sensors (not shown), such as a global positioning system (GPS) sensor, compass, accelerometer, or other sensor.

In some examples, the processor unit 1402 or other suitable hardware component may support a hardware interrupt. In response to a hardware interrupt, the processor unit 1402 may pause its processing and execute an interrupt service routine (ISR), for example, as described herein.

The storage device 1416 includes a machine-readable medium 1422 on which is stored one or more sets of data structures and instructions 1424 (e.g., software) embodying or utilized by any one or more of the methodologies or functions described herein. The instructions 1424 can also reside, completely or at least partially, within the main memory 1404, static memory 1406, and/or within the processor unit 1402 during execution thereof by the architecture 1400, with the main memory 1404, static memory 1406, and the processor unit 1402 also constituting machine-readable media. Instructions stored at the machine-readable medium 1422 may include, for example, instructions for implementing the software architecture 1302, instructions for executing any of the features described herein, etc.

While the machine-readable medium 1422 is illustrated in an example to be a single medium, the term "machine-readable medium" can include a single medium or multiple media (e.g., a centralized or distributed database, and/or associated caches and servers) that store the one or more instructions 1424. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1424 can further be transmitted or received over a communications network 1426 using a transmission medium via the network interface device 1420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
    a coupon management system comprising a processor unit and data storage in communication with the processor unit, the coupon management system being programmed to perform operations comprising:

sending a first committable coupon data structure to a first mobile wallet application executing at a first user computing device, the first committable coupon data structure comprising terms data describing a purchase incentive and cryptographic verification data;

receiving, from an element management system, a verification request, the verification request comprising an indication of a committable coupon data structure to be tokenized and an indication of the first mobile wallet application;

sending a verification message to the element management system, the verification message indicating that the committable coupon data structure to be tokenized corresponds to the committable coupon data structure;

receiving an indication that the first mobile wallet application sent at least a portion of the first committable coupon data structure to a second mobile wallet application;

receiving an indication that the second mobile wallet application has sent a second request to tokenize the first committable coupon data structure received from the first mobile wallet application, the second request requesting a second tokenized coupon data structure generated from the first committable coupon data structure;

and sending, to the first mobile wallet application, a modification message indicating a modification to the purchase incentive for the first mobile wallet application.

2. The system of claim 1, further comprising verifying the committable coupon data structure to be tokenized at least in part by comparing the committable coupon data structure to be tokenized with the first committable coupon data structure.

3. The system of claim 1, the cryptographic verification data comprising a hash of at least a portion of the terms data, the operations further comprising determining that cryptographic verification data of the committable coupon data structure to be tokenized matches terms data of the committable coupon data structure to be tokenized.

4. The system of claim 1, the verification request comprising credential data for authorizing use of a payment element associated with the first mobile wallet application, the operations further comprising generating a tokenized coupon data structure, the tokenized coupon data structure comprising at least a portion of the committable coupon data structure and credential data for authorizing use of the payment element.

5. The system of claim 4, further comprising the element management system, the element management system being programmed to perform operations comprising:
receiving, from a mobile wallet application executing at a first user device, a request to tokenize the committable coupon data structure;
sending the verification request to the coupon management system;
and incorporating the credential data into the committable coupon data structure to generate the tokenized coupon data structure.

6. The system of claim 1, the operations further comprising:
receiving a clearing request indicating that a tokenized coupon data structure corresponding to the first committable coupon data structure has been redeemed by the first mobile wallet application;
storing an indication that the first committable coupon data structure has been redeemed by the first mobile wallet application;
and sending a cleared message indicating that the first committable coupon data structure has been cleared.

7. The system of claim 1, further comprising the first user computing device, the first user computing device being programmed to perform operations comprising:
sending, to the element management system, a request to tokenize the first committable coupon data structure, wherein the request comprises an indication of a payment element associated with the first mobile wallet application;
receiving from the element management system, a first tokenized coupon data structure, wherein the first tokenized coupon data structure comprises at least a portion of the first committable coupon data structure and credential data for authorizing use of the payment element;
and sending a payment request to a merchant system, the payment request comprising the first tokenized coupon data structure as a source of payment for the payment request.

8. The system of claim 7, the first user computing device being further programmed to perform operations comprising:
displaying a user interface at a display of the first user computing device;
receiving search data through the user interface;
displaying, at the user interface, indicators for a plurality of coupons, wherein a first indicator indicates a committable coupon corresponding to the first committable coupon data structure;
receiving, through the user interface, a selection of the first indicator;
and sending to the coupon management system a request for the first committable coupon data structure.

9. A method for utilizing purchase incentives in a mobile wallet application, the method comprising:
sending, by a coupon management system, a first committable coupon data structure to a first mobile wallet application executing at a first user computing device, the first committable coupon data structure comprising terms data describing a purchase incentive and cryptographic verification data, the coupon management system comprising a processor unit and a data storage in communication with the processor unit;
receiving, by the coupon management system and from an element management system, a verification request, the verification request comprising an indication of a committable coupon data structure to be tokenized and an indication of the first mobile wallet application;
sending, by the coupon management system, a verification message to the element management system, the verification message indicating that the committable coupon data structure to be tokenized corresponds to the committable coupon data structure;
receiving, by the coupon management system, an indication that the first mobile wallet application sent at least a portion of the first committable coupon data structure to a second mobile wallet application;
receiving, by the coupon management system, an indication that the second mobile wallet application has sent a second request to tokenize the first committable coupon data structure received from the first mobile wallet application, the second request requesting a second tokenized coupon data structure generated from the first committable coupon data structure;

and sending, by the coupon management system and to the mobile wallet application, a modification message indicating a modification to the purchase incentive for the first mobile wallet application.

10. The method of claim 9, further comprising verifying, by the coupon management system, the committable coupon data structure to be tokenized at least in part by comparing the committable coupon data structure to be tokenized with the first committable coupon data structure.

11. The method of claim 9, the cryptographic verification data comprising a hash of at least a portion of the terms data, further comprising determining, by the coupon management system, that cryptographic verification data of the committable coupon data structure to be tokenized matches terms data of the committable coupon data structure to be tokenized.

12. The method of claim 9, the verification request comprising credential data for authorizing use of a payment element associated with the first mobile wallet application, further comprising generating, by the coupon management system, a tokenized coupon data structure, the tokenized coupon data structure comprising at least a portion of the committable coupon data structure and credential data for authorizing use of the payment element.

13. The method of claim 12, further comprising:
receiving, by the element management system and from a mobile wallet application executing at a first user device, a request to tokenize the committable coupon data structure;
sending, by the element management system, the verification request to the coupon management system;
and incorporating, by the element management system, the credential data into the committable coupon data structure to generate the tokenized coupon data structure.

14. The method of claim 9, further comprising:
receiving, by the coupon management system, a clearing request indicating that a tokenized coupon data structure corresponding to the first committable coupon data structure has been redeemed by the first mobile wallet application;
storing, by the coupon management system, an indication that the first committable coupon data structure has been redeemed by the first mobile wallet application;
and sending, by the coupon management system, a cleared message indicating that the first committable coupon data structure has been cleared.

15. The method of claim 9, further comprising the first user computing device, the first user computing device being programmed to perform operations comprising:
sending, by the first user computing device and to the element management system, a request to tokenize the first committable coupon data structure, wherein the request comprises an indication of a payment element associated with the mobile wallet application;
receiving, by the first user computing device and from the element management system, a first tokenized coupon data structure, wherein the first tokenized coupon data structure comprises at least a portion of the first committable coupon data structure and credential data for authorizing use of the payment element;
and sending, by the first user computing device, a payment request to a merchant system, the payment request comprising the first tokenized coupon data structure as a source of payment for the payment request.

16. The method of claim 15, further comprising:
displaying, by the first user computing device, a user interface at a display of the first user computing device;
receiving, by the first user computing device, search data through the user interface;
displaying, by the first user computing device and at the user interface, indicators for a plurality of coupons, wherein a first indicator indicates a committable coupon corresponding to the first committable coupon data structure;
receiving, by the first user computing device and through the user interface, a selection of the first indicator;
and sending, by the first user computing device and to the coupon management system, a request for the first committable coupon data structure.

17. A non-transitory machine-readable medium comprising instructions thereon that, when executed by a machine, cause the machine to perform operations comprising:
sending, by a coupon management system, a first committable coupon data structure to a first mobile wallet application executing at a first user computing device, the first committable coupon data structure comprising terms data describing a purchase incentive and cryptographic verification data, the coupon management system comprising a processor unit and a data storage in communication with the processor unit;
receiving, by the coupon management system and from an element management system, a verification request, the verification request comprising an indication of a committable coupon data structure to be tokenized and an indication of the first mobile wallet application;
sending, by the coupon management system, a verification message to the element management system, the verification message indicating that the committable coupon data structure to be tokenized corresponds to the committable coupon data structure;
receiving, by the coupon management system, an indication that the first mobile wallet application sent at least a portion of the first committable coupon data structure to a second mobile wallet application;
receiving, by the coupon management system, an indication that the second mobile wallet application has sent a second request to tokenize the first committable coupon data structure received from the second mobile wallet application, the second request requesting a second tokenized coupon data structure generated from the first committable coupon data structure;
and sending, by the coupon management system and to the first mobile wallet application, a modification message indicating a modification to the purchase incentive for the first mobile wallet application.

18. The medium of claim 17, the operations further comprising verifying, by the coupon management system, the committable coupon data structure to be tokenized at least in part by comparing the committable coupon data structure to be tokenized with the first committable coupon data structure.

19. The medium of claim 17, the cryptographic verification data comprising a hash of at least a portion of the terms data, the operations further comprising determining, by the coupon management system, that cryptographic verification data of the committable coupon data structure to be tokenized matches terms data of the committable coupon data structure to be tokenized.

20. The medium of claim 17, the verification request comprising credential data for authorizing use of a payment element associated with the first mobile wallet application, the operations further comprising generating, by the coupon management system, a tokenized coupon data structure, the tokenized coupon data structure comprising at least a portion of the committable coupon data structure and credential data for authorizing use of the payment element.

* * * * *

UNITED STATES PATENT AND TRADEMARK OFFICE
CERTIFICATE OF CORRECTION

PATENT NO. : 11,416,847 B1
APPLICATION NO. : 17/248820
DATED : August 16, 2022
INVENTOR(S) : Ramanathan et al.

It is certified that error appears in the above-identified patent and that said Letters Patent is hereby corrected as shown below:

On the Title Page

In Column 1, item (56) under "U.S. Patent Documents", Line 2, delete "2009/0000361" and insert --2009/0036103-- therefor In the Claims In Column 23, Lines 25-26, in Claim 1, after "structure;", insert --and--

In Column 23, Line 27, in Claim 1, before "sending,", delete "and"

In Column 23, Line 58, in Claim 5, after "system;", insert --and--

In Column 23, Line 59, in Claim 5, before "incorporating", delete "and"

In Column 24, Line 3, in Claim 6, after "application;", insert --and--

In Column 24, Line 4, in Claim 6, before "sending", delete "and"

In Column 24, Line 20, in Claim 7, after "element;", insert --and--

In Column 24, Line 21, in Claim 7, before "sending", delete "and"

In Column 24, Line 36, in Claim 8, after "indicator;", insert --and--

In Column 24, Line 37, in Claim 8, before "sending", delete "and"

In Column 25, Line 2, in Claim 9, after "structure;", insert --and--

In Column 25, Line 3, in Claim 9, before "sending,", delete "and"

Signed and Sealed this
Twenty-fifth Day of October, 2022

*Katherine Kelly Vidal*

Katherine Kelly Vidal
*Director of the United States Patent and Trademark Office*

CERTIFICATE OF CORRECTION (continued)
U.S. Pat. No. 11,416,847 B1

In Column 25, Line 34, in Claim 13, after "system;", insert --and--

In Column 25, Line 35, in Claim 13, before "incorporating,", delete "and"

In Column 25, Line 48, in Claim 14, after "application;", insert --and--

In Column 25, Line 49, in Claim 14, before "sending,", delete "and"

In Column 25, Line 65, in Claim 15, after "element;", insert --and--

In Column 25, Line 66, in Claim 15, before "sending,", delete "and"

In Column 26, Line 15, in Claim 16, after "indicator;", insert --and--

In Column 26, Line 16, in Claim 16, before "sending,", delete "and"

In Column 26, Line 50, in Claim 17, after "structure;", insert --and--

In Column 26, Line 51, in Claim 17, before "sending,", delete "and"